United States Patent
Lee et al.

(10) Patent No.: US 10,531,268 B2
(45) Date of Patent: Jan. 7, 2020

(54) METHOD AND APPARATUS FOR TRANSCEIVING A WARNING MESSAGE IN A WIRELESS COMMUNICATION SYSTEM

(71) Applicant: LG Electronics Inc., Seoul (KR)

(72) Inventors: Ki-Dong Lee, San Diego, CA (US); Sungduck Chun, San Diego, CA (US); Sanggook Kim, San Diego, CA (US)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/461,047

(22) PCT Filed: Nov. 17, 2017

(86) PCT No.: PCT/KR2017/013136
§ 371 (c)(1),
(2) Date: May 15, 2019

(87) PCT Pub. No.: WO2018/093208
PCT Pub. Date: May 24, 2018

(65) Prior Publication Data
US 2019/0313232 A1    Oct. 10, 2019

Related U.S. Application Data

(60) Provisional application No. 62/423,751, filed on Nov. 17, 2016, provisional application No. 62/452,867, filed on Jan. 31, 2017.

(51) Int. Cl.
*H04W 76/50* (2018.01)
*H04W 4/90* (2018.01)
(Continued)

(52) U.S. Cl.
CPC ............. *H04W 4/90* (2018.02); *H04W 68/02* (2013.01); *H04W 4/029* (2018.02); *H04W 4/06* (2013.01)

(58) Field of Classification Search
None
See application file for complete search history.

(56) References Cited

U.S. PATENT DOCUMENTS

2015/0200734 A1   7/2015  Wang et al.
2015/0382168 A1  12/2015  Sammour et al.
2018/0365958 A1*  12/2018  Beszteri ............ H04L 29/08

FOREIGN PATENT DOCUMENTS

WO      2016073101      5/2016

OTHER PUBLICATIONS

"3GPP, TSG SA; Public Warning System (PWS) Requirements (Release 13)," 3GPP TS 22.268 V13.0.0 (Dec. 2015), Dec. 18, 2015, see sections 4.3-4.5, 4.6.4.

(Continued)

*Primary Examiner* — Suhail Khan
(74) *Attorney, Agent, or Firm* — Dentons US LLP

(57) ABSTRACT

Disclosed herein is a method for receiving a warning message in a wireless communication system.
The method performed by a terminal comprises receiving, from a base station, first control information indicating whether or not a use of a pre-defined string (PDS) set including one or more PDSs used for a Public Warning System (PWS) is enabled; receiving, from the base station, second control information associated with a configuration of the PDS set; receiving, from the base station, the warning message; and outputting an alarm information based on the received warning message.

20 Claims, 13 Drawing Sheets

(51) Int. Cl.
*H04W 68/02* (2009.01)
*H04W 4/029* (2018.01)
*H04W 4/06* (2009.01)

(56) References Cited

OTHER PUBLICATIONS

3GPP TSG-T, "LS-Use of SMS and CBS for Emergencies," TP-050051, Technical Specification Group Terminals Meeting #27, Tokyo, Japan, Mar. 10, 2005, see section 1.

* cited by examiner

[Figure 1]
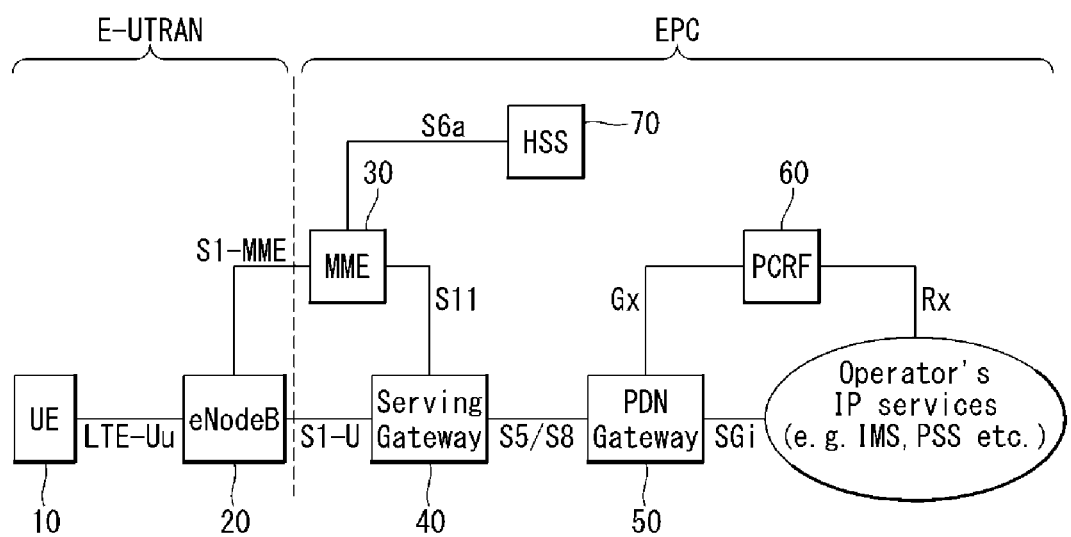

[Figure 2]
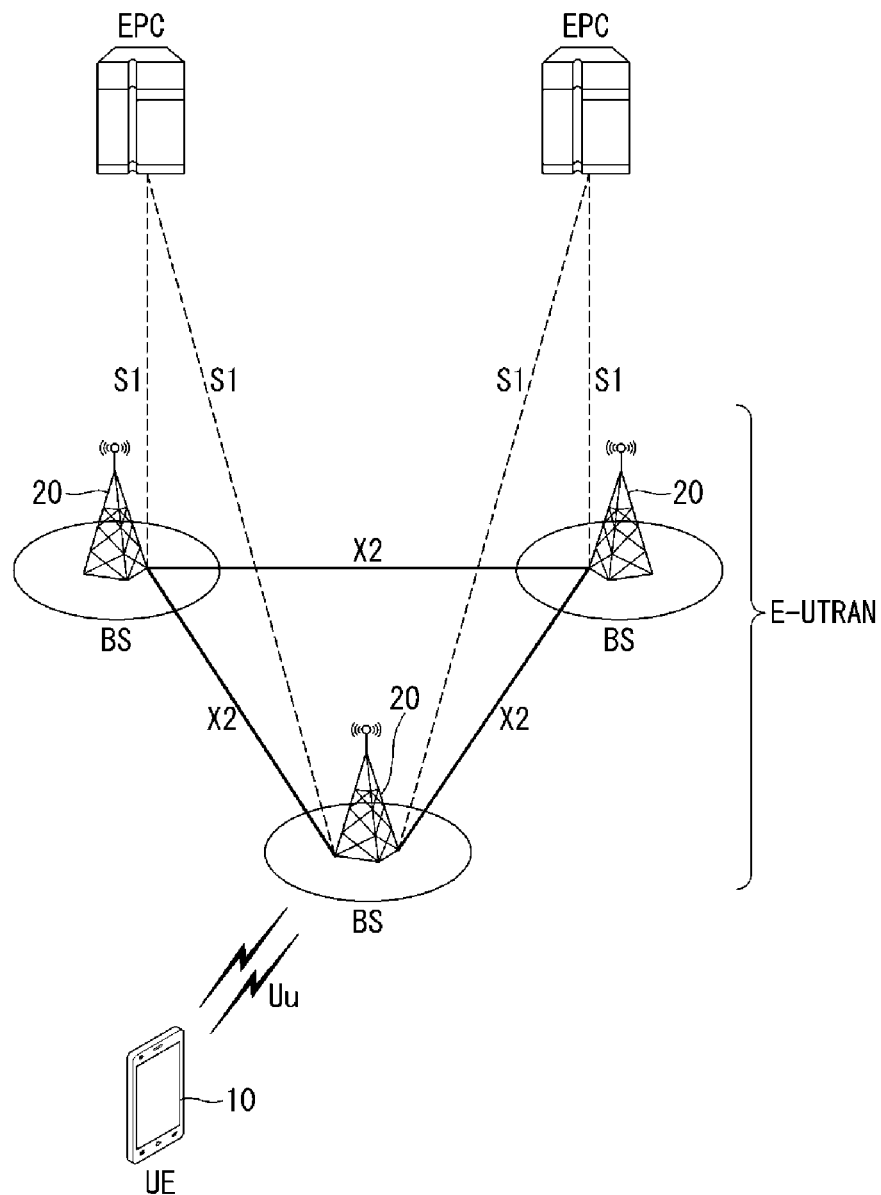
[Figure 3]
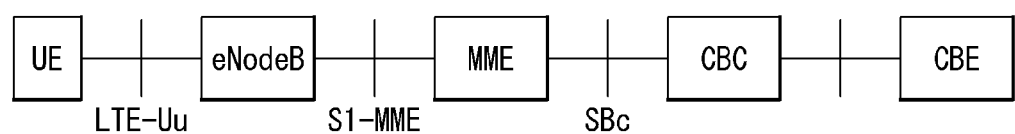

[Figure 4]
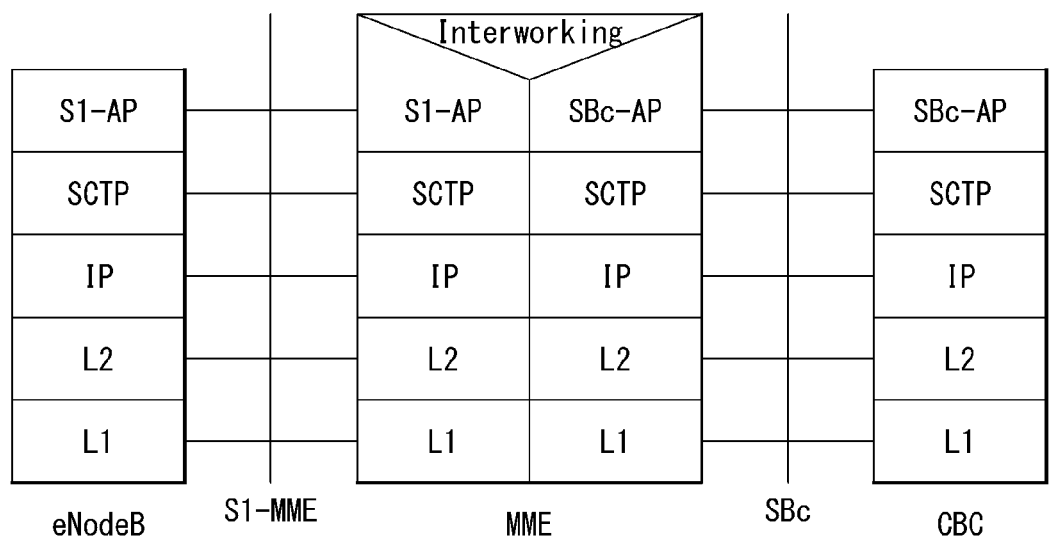

[Figure 5]
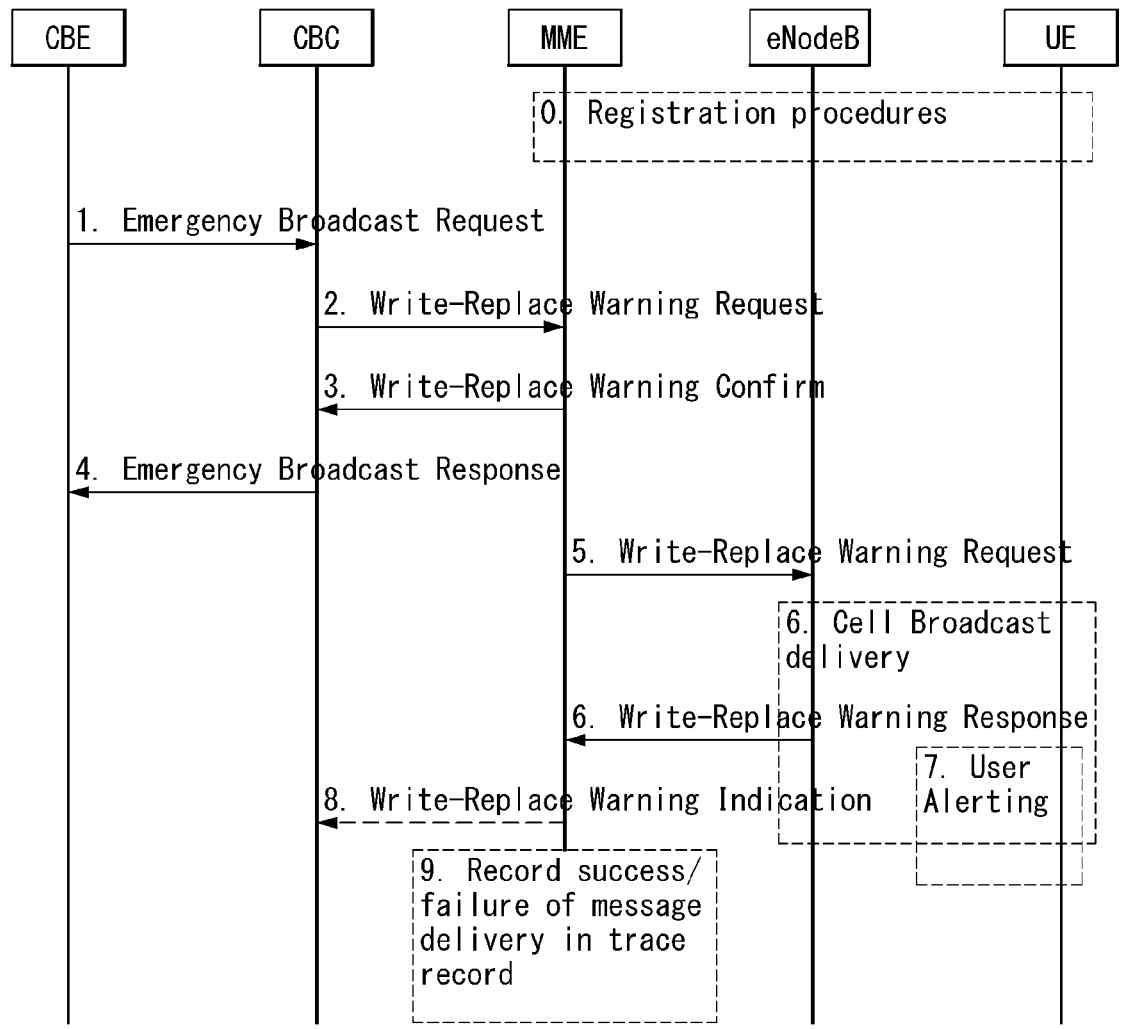

[Figure 6]
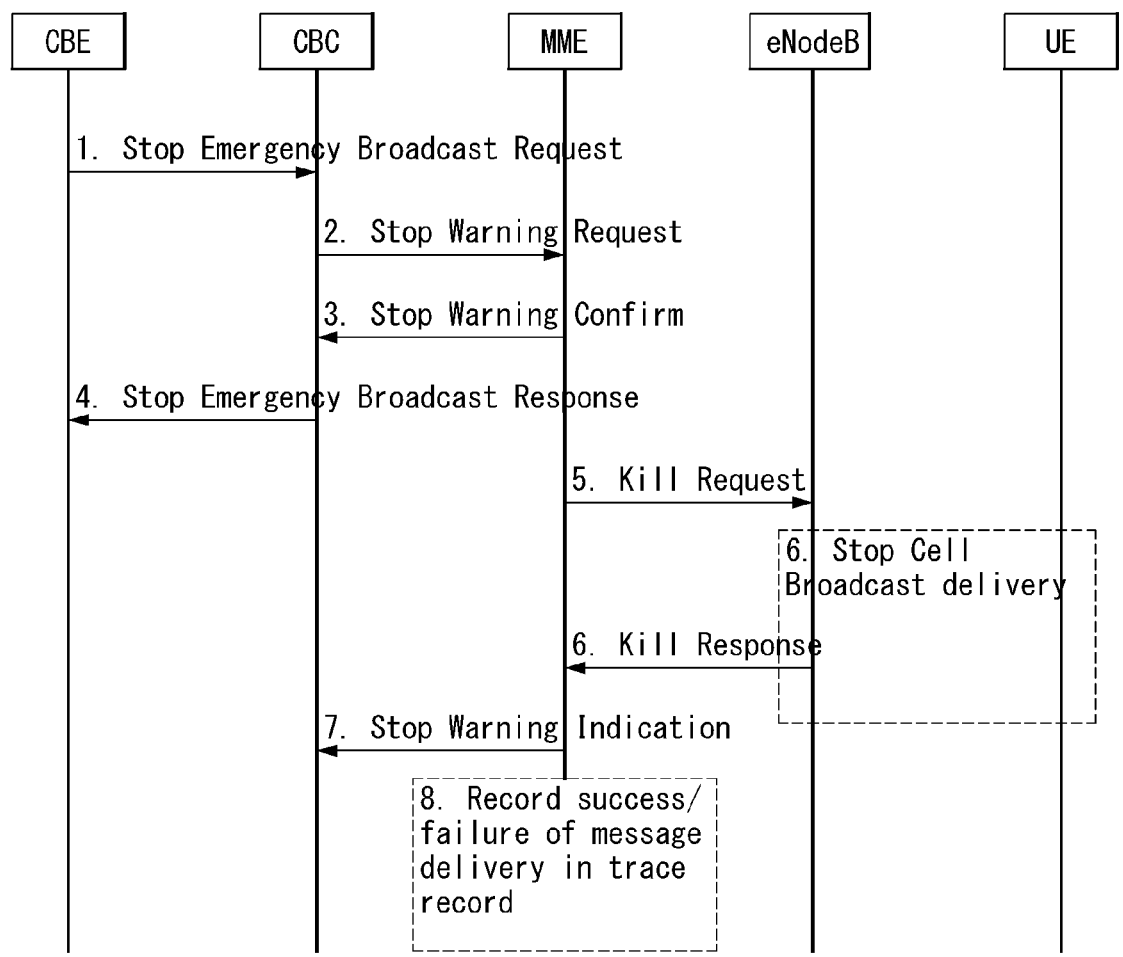

[Figure 7]
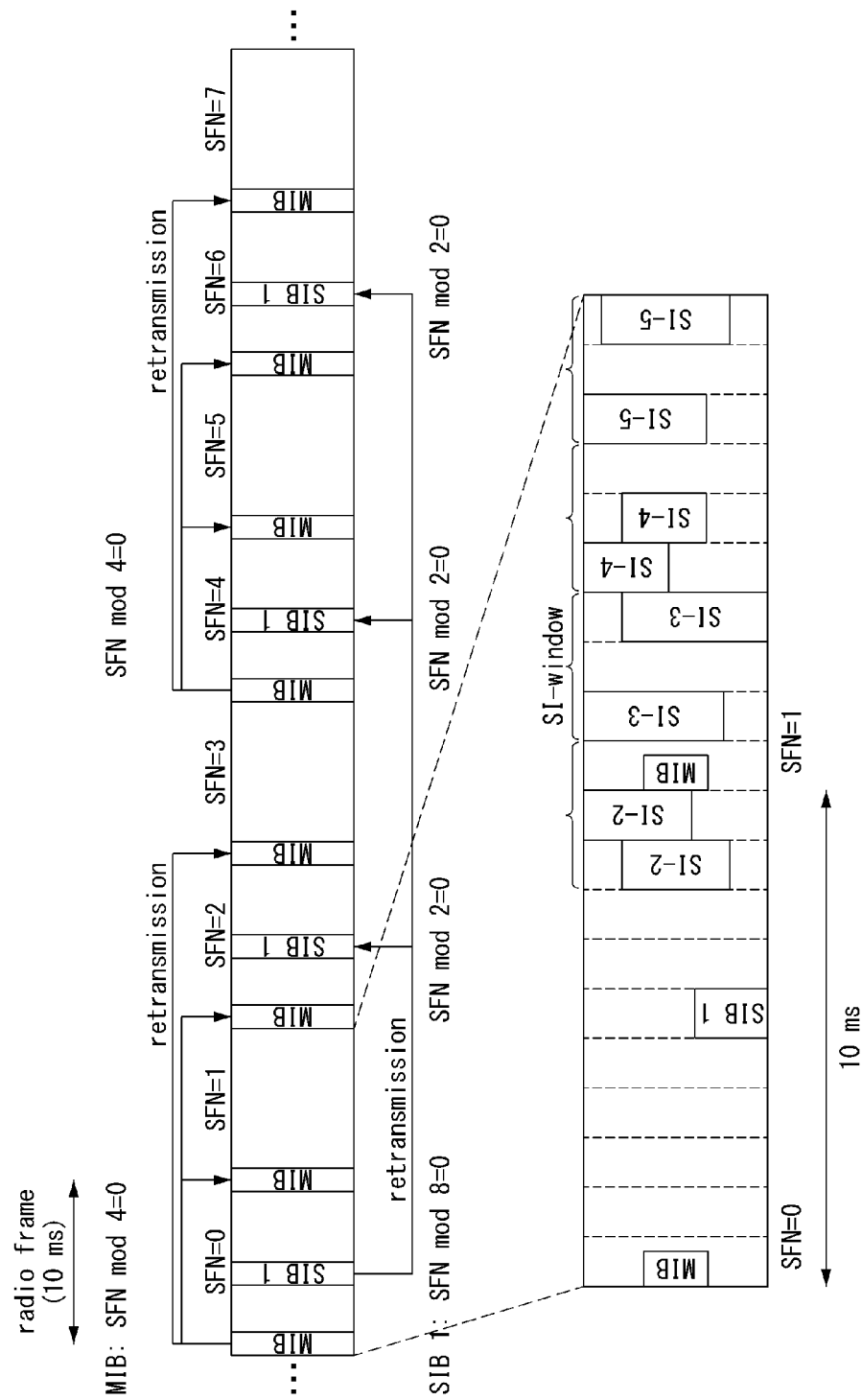

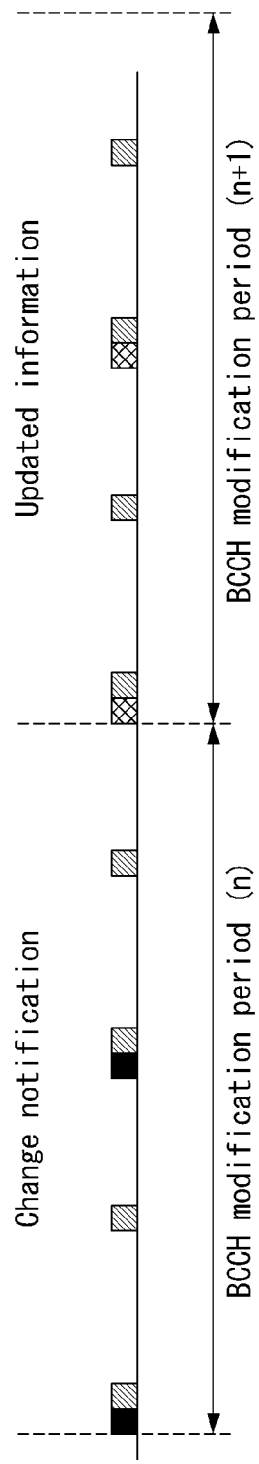
[Figure 8]

[Figure 9]
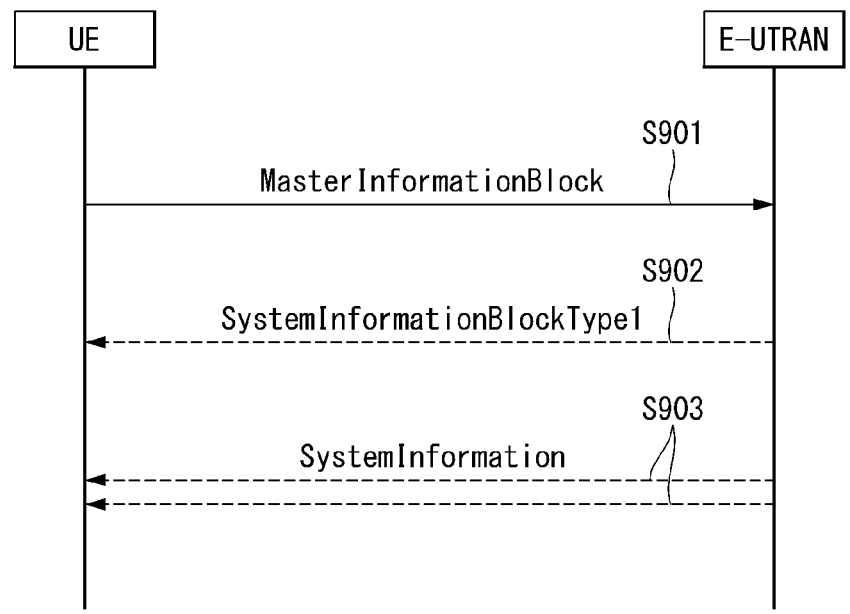

[Figure 10]
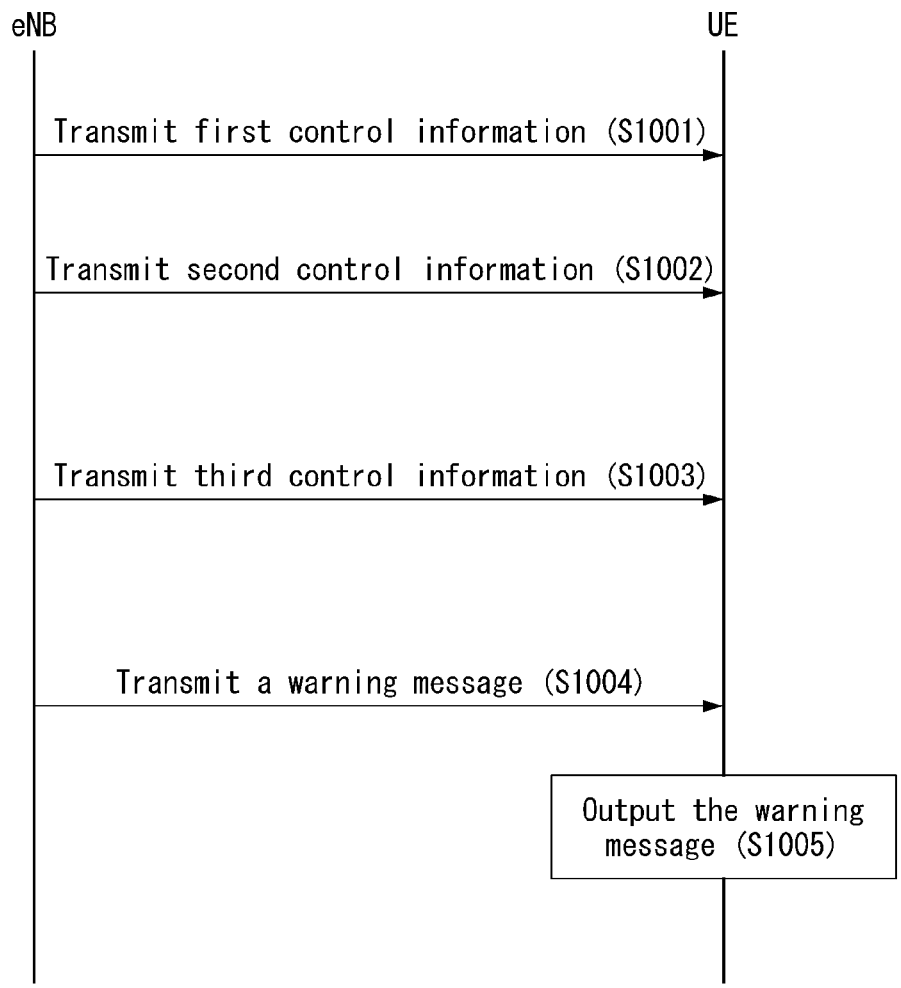

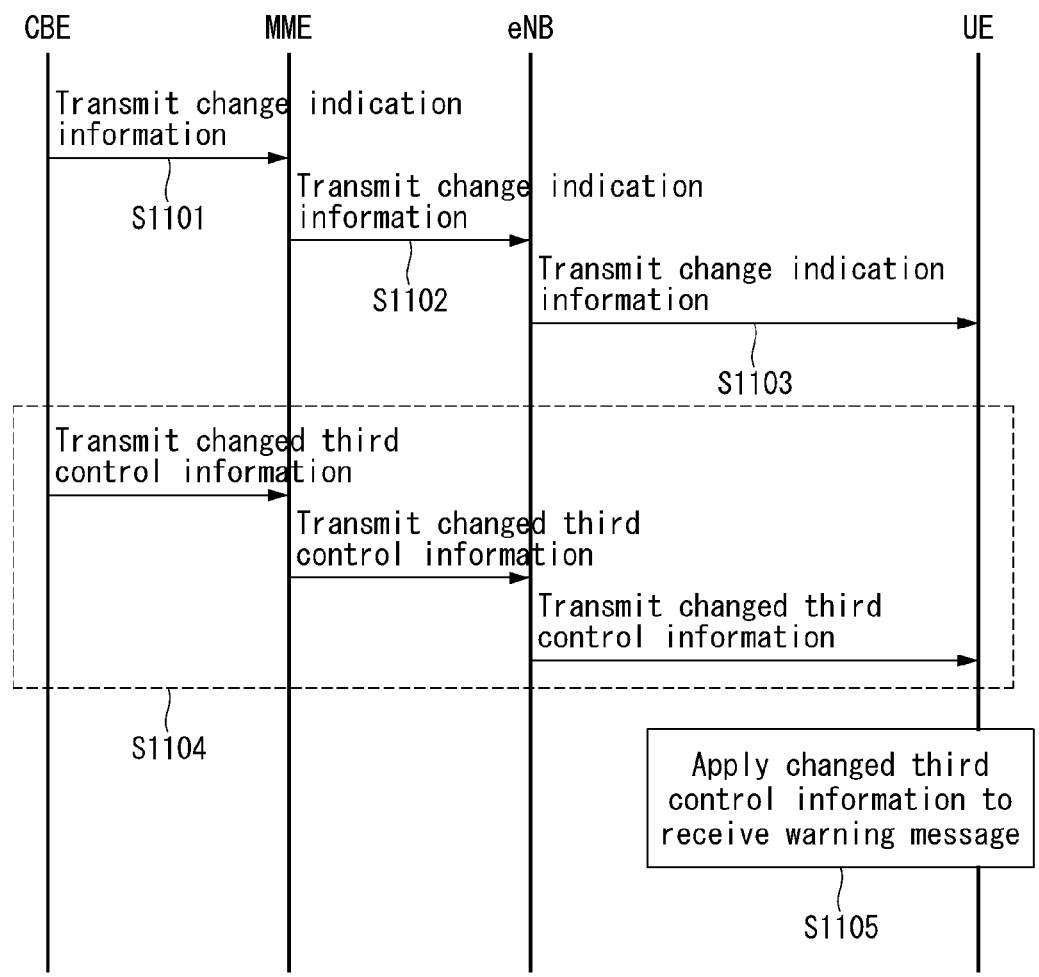
[Figure 11]

[Figure 12]
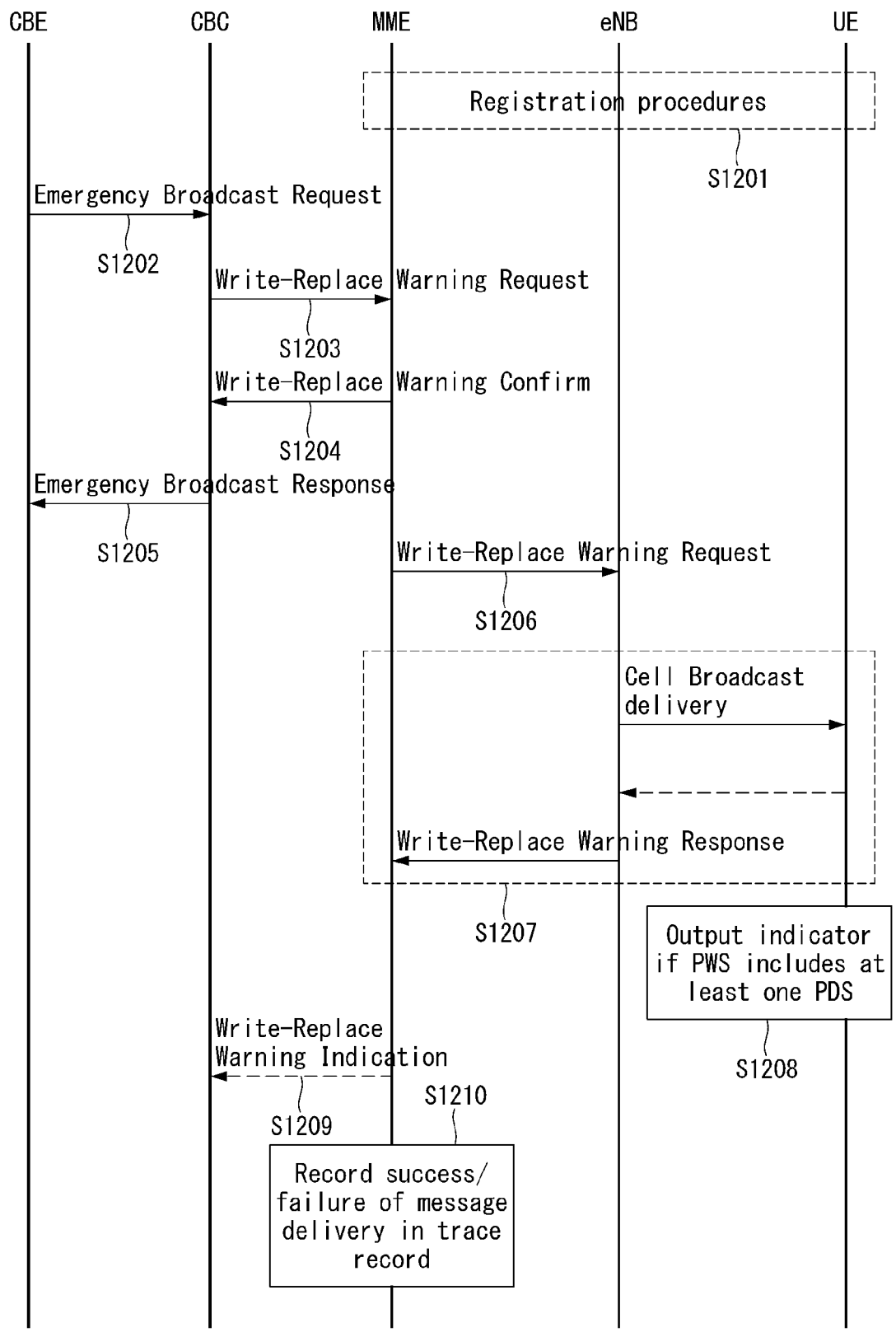

[Figure 13]
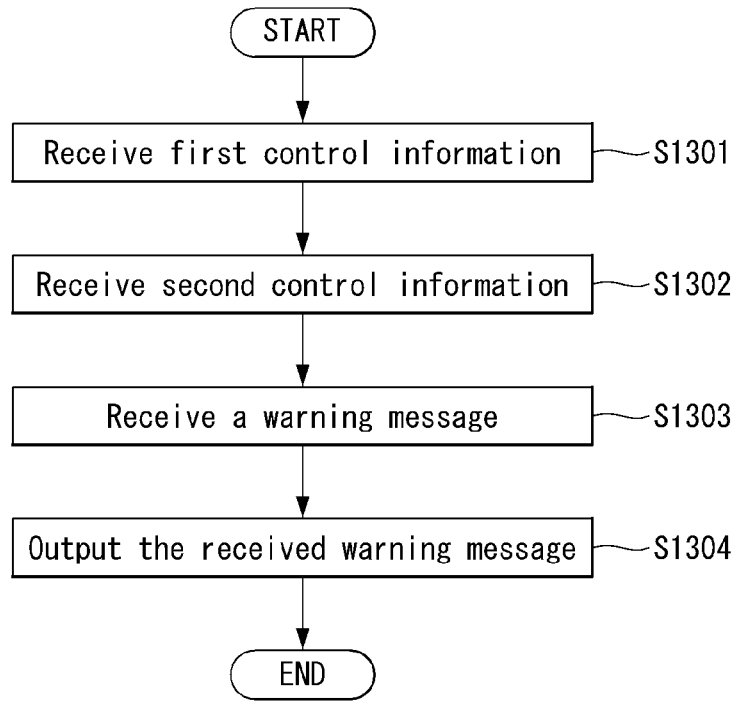
[Figure 14]
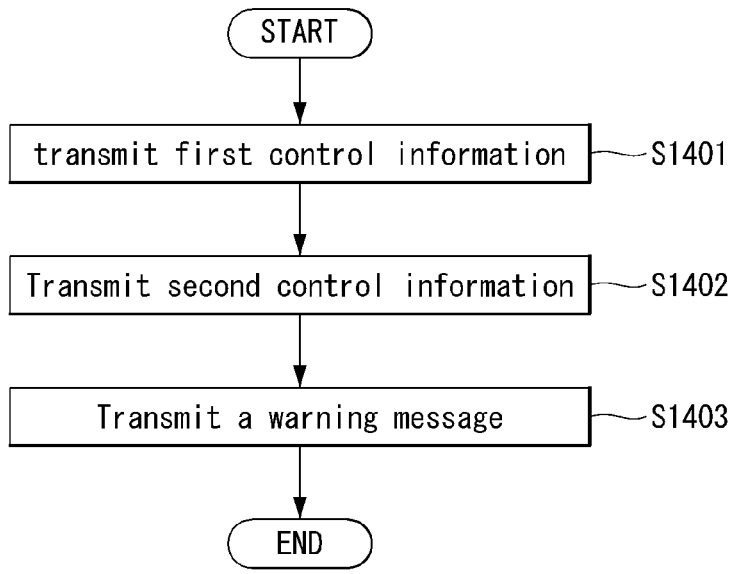

[Figure 15]
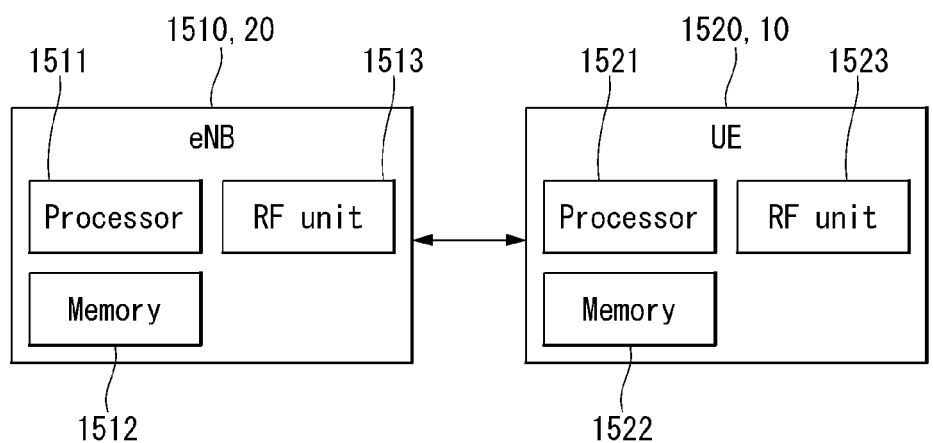

METHOD AND APPARATUS FOR TRANSCEIVING A WARNING MESSAGE IN A WIRELESS COMMUNICATION SYSTEM

CROSS-REFERENCE TO RELATED APPLICATIONS

This application is the National Stage filing under 35 U.S.C. 371 of International Application No. PCT/KR2017/013136, filed on Nov. 17, 2017, which claims the benefit of U.S. Provisional Application No. 62/423,751, filed on Nov. 17, 2016 and U.S. Provisional Application No. 62/425,867, filed on Jan. 31, 2017, the contents of which are all hereby incorporated by reference herein in their entirety.

TECHNICAL FIELD

This specification relates to a method and apparatus for transceiving a warning message in a wireless communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

The present specification provides a method for transmitting a warning message by using a pre-defined string (PDS) set including PDSs or the PDSs.

Objects to be achieved in this specification are not limited to the aforementioned advantages, and those skilled in the art to which the present invention pertains may evidently understand other objects from the following description.

Technical Solution

In this specification, a method for receiving a warning message in a wireless communication system, the method performed by a terminal comprising: receiving, from a base station, first control information indicating whether or not the use of a pre-defined string (PDS) set is enabled, wherein the PDS set includes one or more PDSs used to immediately recognize occurrence of an emergency, wherein the one or more pre-defined string (PDS)s are associated with an alarm information that the warning message is outputted visually, audibly or tactilely; receiving, from the base station, second control information associated with a configuration of the PDS set, wherein the second control information includes at least one of first indication information indicating the PDS set, second indication information indicating a number of the PDSs included in the PDS set, or third indication information indicating a length of each PDS within the PDS set; receiving, from the base station, the warning message; determining whether to output the warning message as a text or as the alarm information corresponding to the one or more PDSs based on the received indication information; and outputting the warning message according to the determination result.

Furthermore, in this specification, the alarm information is information defined by a specific PDS if the received warning message includes the specific PDS configured by at least one PDS.

Furthermore, in this specification, if the use of the PDS set is enabled, the warning message is outputted to the alarm information corresponding to the one or more PDSs, and if the use of the PDS set is not enabled, the warning message is outputted to the text.

Furthermore, in this specification, the third indication information is included in the second control information if the length of each PDS within the PDS set is different.

Furthermore, in this specification, the alarm information is one or more of an image, an icon, sound and vibration.

Furthermore, in this specification, the method further comprises receiving, from the base station, third control information indicating a configuration of the specific PDS included in the warning message.

Furthermore, in this specification, the first control information is received through an attach procedure with the base station.

Furthermore, in this specification, the first control information is received through a system information block (SIB) 1, wherein the second control information is received through a system information block (SIB) type 2, and wherein the third control information is received through a system information block (SIB) type 12.

Furthermore, in this specification, the method further comprises receiving fourth control information indicating whether or not the second control information is changed from the base station.

Furthermore, in this specification, the fourth control information is included in a system information block or a paging message.

Furthermore, in this specification, the method for transmitting a warning message in a wireless communication system, the method performed by a base station comprising: transmitting, to a terminal, first control information indicating whether or not the use of a pre-defined string (PDS) set is enabled, wherein the PDS set includes one or more PDSs used to immediately recognize occurrence of an emergency, wherein the one or more pre-defined string (PDS)s are associated with an alarm information that the warning message is outputted visually, audibly or tactilely; transmitting, to the terminal, second control information associated with a configuration of the PDS set, wherein the second control information includes at least one of first indication information indicating the PDS set, second indication information indicating a number of the PDSs included in the PDS set, or third indication information indicating a length of each PDS within the PDS set; transmitting a first warning message to the terminal.

Furthermore, in this specification, the method further comprises receiving at least one second warning message from at least one MME (mobility management entity), wherein the at least one second warning message includes at least one of a message identifier or a message sequence number; and checking whether the at least one received second warning message is the same message by using at least one of the message identifier or the message serial number.

Furthermore, in this specification, if the at least received one second warning message is the same, only the first warning message is transmitted to the terminal.

Furthermore, in this specification, the method further comprises determining at least one cell for transmitting the at least one received second warning message to the terminal based on the alert area information included in the at least received one second warning message.

Furthermore, in this specification, the at least one second warning message comprises third control information indicating whether or not concurrent transmission of a warning message is supported.

Furthermore, in this specification, the method further comprises determining whether to transmit the first warning message and the second warning message simultaneously based on the received third control information.

Furthermore, in this specification, the third control information is included in the second warning message if the first warning message is transmitted to the terminal.

Furthermore, in this specification, if the third control information indicates the support of concurrent transmission, the first warning message and the second warning message are transmitted to the terminal simultaneously, if the third control information does not indicate the support of concurrent transmission, the transmission of the first warning message is stopped, and the second warning message are transmitted to the terminal.

Furthermore, in this specification, the third control information is not included in the second warning message, the second warning message has a higher priority than the first warning message.

Furthermore, in this specification, the first warning message is transmitted to the terminal on a predetermined time interval.

Advantageous Effects

An illiterate person or a foreigner can easily recognize an emergency situation by transmitting a warning message using PDS(s).

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 shows an example of the basic network structure of PWS architecture in E-UTRAN.

FIG. 4 is an example of an E-UTRAN Protocol between a CBC and an eNodeB.

FIG. 5 is an example of an overall warning message delivery procedure to which the present invention may be applied.

FIG. 6 is an example of warning message cancel procedure in E-UTRAN to which the present invention may be applied.

FIG. 7 exemplifies a transmission of the system information in a wireless communication system to which the present invention can be applied.

FIG. 8 is a view illustrating the modification of the system information in a wireless communication system to which the present invention can be applied.

FIG. 9 is a view illustrating a system information acquisition procedure in a wireless communication system to which the present invention can be applied.

FIG. 10 is a flowchart illustrating a method for transceiving a warning message using PDS(s) proposed in the present specification.

FIG. 11 is a flowchart illustrating a method for changing PDS configuration proposed in the present specification.

FIG. 12 is a flowchart illustrating another method for transceiving a warning message using PDS(s) proposed in the present specification.

FIG. 13 is a flowchart illustrating an operation method of a terminal receiving a warning message using PDS proposed in the present specification.

FIG. 14 is a flowchart illustrating an operation method of a base station transmitting a warning message using PDS proposed in the present specification.

FIG. 15 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A pro is an evolution of 3GPP LTE-A. 5G NR is a revolution of 3GPP LTE-A that will be implemented by OFDMA or its variants.

For the purposes of the present invention, the following abbreviations apply.

ACK Acknowledgement
AM Acknowledged Mode
AMBR Aggregate Maximum Bit Rate
ARQ Automatic Repeat Request
AS Access Stratum
BCCH Broadcast Control Channel
BCH Broadcast Channel
BSC Base Station Controller
BSR Buffer Status Report
CA Carrier Aggregation
CBC Cell Broadcast Center
CBE Cell Broadcast Entity
CBS Cell Broadcast Service
CC Component Carrier
CG Cell Group
CMAS Commercial Mobile Alert Service
CP Cyclic Prefix
CoMP Coordinated Multi Point
C-plane Control Plane
C-RNTI Cell RNTI
CQI Channel Quality Indicator
CRC Cyclic Redundancy Check
CRS Cell-specific Reference Signal
DC Dual Connectivity
DCCH DCN Dedicated Core Network
DeNB Donor eNB
DL Downlink
DRB Data Radio Bearer
ECM EPS Connection Management
EMM EPS Mobility Management
eIMTA Enhanced Interference Management and Traffic Adaptation
eNB E-UTRAN NodeB
EPC Evolved Packet Core
EPS Evolved Packet System
E-RABE-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
FEMA Federal Emergency Management Agency
GERAN GSM EDGE Radio Access Network
GNSS Global Navigation Satellite System
GSM Global System for Mobile communication
GBR Guaranteed Bit Rate
GP Guard Period
HARQ Hybrid ARQ
(H)eNB eNB or Home Enb
HFN Hyper Frame Number
HO Handover
HPLMN Home Public Land Mobile Network
HSDPA High Speed Downlink Packet Access
ID Identification or Identifier
IP Internet Protocol
LTE Long Term Evolution
MAC Medium Access Control
MBMS Multimedia Broadcast Multicast Service
MBR Maximum Bit Rate
MBSFN Multimedia Broadcast multicast service Single Frequency Network
MCG Master Cell Group
MeNB Master eNB
MIB Master Information Block
MIMO Multiple Input Multiple Output
MME Mobility Management Entity
MTC Machine-Type Communications
NACK Negative Acknowledgement
NAS Non-Access Stratum
OFDM Orthogonal Frequency Division Multiplexing
OFDMA Orthogonal Frequency Division Multiple Access
OMC Operation and Maintenance Center
P-GW PDN Gateway
PAPR Peak-to-Average Power Ratio
PCell Primary Cell
PDCCH Physical Downlink Control CHannel
PDCP Packet Data Convergence Protocol
PDN Packet Data Network
PDSCH Physical Downlink Shared CHannel
PDU Protocol Data Unit
PHY Physical layer
PLMN Public Land Mobile Network
PSAP Public Safety Answering Point
PSCell Primary SCell
PUCCH Physical Uplink Control CHannel
PUSCH Physical Uplink Shared CHannel
PWS Public Warning System
QoS Quality of Service
RACH Random Access Channel
RB Radio Bearer
RF Radio Frequency RLC Radio Link Control
RN Relay Node
RNC Radio Network Controller
RNL Radio Network Layer
RNTI Radio Network Temporary Identifier
ROHC Robust Header Compression
RRC Radio Resource Control
RRM Radio Resource Management
S-GW Serving Gateway
S1-MME S1 for the control plane
SCC Secondary Component Carrier
SCell Secondary Cell
SCG Secondary Cell Group
SeNB Secondary eNB
SI System Information
SIB System Information Block
S1-U S1 for the user plane
SAE System Architecture Evolution
SAP Service Access Point
SC-FDMA Single Carrier-Frequency Division Multiple Access
SDF SFN System Frame Number
SDU Service Data Unit
S-GW Serving GateWay
SRB Signalling Radio Bearer
TCP Transmission Control Protocol
TDD Time Division Duplex
TDM Time Division Multiplexing
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
WLAN Wireless Local Area Network
WEA Wireless Emergency Alert
X2 GW X2 GateWay
X2-C X2-Control plane
X2-U X2-User plane For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Commercial Mobile Alert System: Public Warning System that delivers Warning Notifications provided by Warning Notification Providers to CMAS capable PWS-UEs. CMAS defines three different classes of Warning Notifications (Presidential, Imminent Threat and Child Abduction Emergency)

Dual Connectivity: mode of operation of a UE in RRC_CONNECTED, configured with a Master Cell Group and a Secondary Cell Group.

Earthquake and Tsunami Warning System: Public Warning System that delivers Warning Notifications specific to Earthquake and Tsunami provided by Warning Notification Providers to the UEs which have the capability of receiving Primary and Secondary Warning Notifications within Notification Areas through the 3GPP network E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Handover: procedure that changes the serving cell of a UE in RRC_CONNECTED.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MCG bearer: in dual connectivity, a bearer whose radio protocols are only located in the MeNB to use MeNB resources only.

Notification Area: area where Warning Notifications are broadcast. This is an area that closely approximates the geographical information provided by the Warning Notification Provider Power saving mode: mode configured and controlled by NAS that allows the UE to reduce its power consumption.

PWS-UE: User Equipment (UE) which has the capability of receiving Warning Notifications within Notification Areas through the 3GPP network and conforms to the behaviour specific to the PWS service such as dedicated alerting indication and display of the Warning Notification upon reception SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Split bearer: in dual connectivity, a bearer whose radio protocols are located in both the MeNB and the SeNB to use both MeNB and SeNB resources.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 shows an example of the basic network structure of PWS architecture in E-UTRAN.

The cell broadcast centre (CBC) is part of the core network and connected to the MME via the SBc reference point.

The functionality of the CBE is assumed that the CBE is responsible for all aspects of formatting CBS messages, including the splitting of a CBS message into a number of pages.

The CBC is integrated as a node in the core network.

The CBC may be connected to several BSCs/RNCs/MMEs. The CBC may be connected to several CBEs. The CBC shall be responsible for the management of CBS messages including:

allocation of serial numbers;

modifying or deleting CBS messages held by the BSC/RNC/eNodeB;

initiating broadcast by sending fixed length CBS messages to a BSC/RNC/eNodeB for each language provided by the cell, and where necessary padding the pages to a length of 82 octets;

determining the set of cells to which a CBS message should be broadcast, and indicating within the Serial Number the geographical scope of each CBS message;

determining the time at which a CBS message should commence being broadcast;

determining the time at which a CBS message should cease being broadcast and subsequently instructing each BSC/RNC/eNodeB to cease broadcast of the CBS message;

determining the period at which broadcast of the CBS message should be repeated;

determining the cell broadcast channel in GSM, on which the CBS message should be broadcast.

when CBS transmits emergency messages, allocation of "emergency indication" to differentiate it from normal CBS messages, including the "Cell ID/Service Area ID list" "warning type", "warning message". If "warning type" is of 'test', only UEs which are specially designed for testing purposes may display warning message.

To work efficiently on the interfaces, the BSC/RNC—which is normally controlling more than one cell of a broadcast area—should be used as a concentrator as far as CBS message handling is concerned. Hence, the CBC should work on lists of cells when issuing CB related requests towards the BSC/RNC.

FIG. 4 is an example of an E-UTRAN Protocol between a CBC and an eNodeB.

SBc Application Protocol (SBc-AP): Application Layer Protocol between CBC and MME. This protocol supports transfer of warning messages.

S1 Application Protocol (S1-AP): Application Layer Protocol between the eNodeB and the MME.

SCTP for the control plane (SCTP): This protocol guarantees delivery of signalling messages between MME and eNodeB (S1). SCTP is defined in RFC 4960 [33].

Warning Message Delivery Procedure in E-UTRAN

The maximum size of the warning message for E-UTRAN is different from that for UTRAN/GERAN.

When S1-flex is used, the eNodeB may receive duplicated warning messages. Duplicated messages can be detected by checking the message identifier and serial number fields and they shall not be transmitted on the radio interface.

The warning message to be broadcast is delivered via MMEs to multiple eNodeBs. The eNodeB(s) are responsible for scheduling the broadcast of the new message and the repetitions in each cell.

FIG. 5 is an example of an overall warning message delivery procedure to which the present invention may be applied.

0. Network registration and security (e.g. mutual authentication) procedures are performed.

This step is performed each time a UE is attached to a network (e.g. after each power on).

1. CBE (e.g. Information Source such as PSAP or Regulator) sends emergency information (e.g. "warning type", "warning message", "impacted area", "time period") to the CBC. The CBC shall authenticate this request.

2. Using the "impacted area" information, the CBC identifies which MMEs need to be contacted and determines the information to be place into the Warning Area Information Element. The CBC sends a Write-Replace Warning Request message containing the warning message to be broadcast and the delivery attributes (Message identifier, Serial Number, Tracking Area ID list, Warning Area, OMC ID, CWM Indicator, Send Write-Replace-Warning-Indication, Global eNB ID) to MMEs.

The warning messages use the coding scheme for CBS data specified in 3GPP TS 23.038.

The Tracking Area ID list is only used by the MME. The MME uses it for selecting which eNodeBs to forward the Write-Replace Warning Request message to.

If the Write-Replace Warning Request message is sent to reload cells served by an eNodeB, for which the CBC has previously received a Restart Indication, the CBC shall include the Global eNB ID IE with the identity of this eNodeB in the Write-Replace Warning Request message.

The Warning Area shall be a list of Cell IDs or a list of TAIs or one or more Emergency Area IDs. The Warning Area is only used by the eNodeB. The eNodeB is configured with the TAI(s) and Cell ID(s) it serves and the Emergency Area ID(s) that it belongs to. The eNodeB checks for any match of the contents of the Warning Area with these IDs to identify the cells where to distribute the warning message. The Warning Area is an optional information element. If the Warning Area is absent, it shall be interpreted as "all cells on the eNodeB". The number of cell IDs will be limited by the message size on SBc and S1-MME. An Emergency Area ID is unique within the PLMN.

The message may include an OMC ID. If present, it indicates the OMC to which the Trace record generated in step 9 is destined. Co-location of that OMC with the CBC is an operator option.

CBC shall set the Concurrent Warning Message (CWM) indicator in all Write-Replace Warning Request messages, if the PLMN supports concurrent warning message broadcasts.

The CBC shall not include the "digital signature" or "timestamp" information.

CBC shall set the Send Write-Replace-Warning Indication element in case the MME is requested to forward the Broadcast Scheduled Area List in a Write-Replace Warning Indication for the warning message.

Due to requirements in earlier versions of the specification, it is possible that "digital signature" and "timestamp" information are transmitted within the "warning message".

3. The MME sends a Write-Replace Warning Confirm message that indicates to the CBC that the MME has started to distribute the warning message to eNodeBs.

The Write-Replace Warning Confirm message may contain the Unknown Tracking Area List IE. The Unknown Tracking Area List IE identifies the Tracking Areas that are unknown to the MME and where the Request cannot be delivered.

If this message is not received by the CBC within an appropriate time period, the CBC can attempt to deliver the warning message via another MME in the same pool area.

4. Upon reception of the Write-Replace Confirm messages from the MMEs, the CBC may confirm to the CBE that it has started to distribute the warning message.

5. The MME forwards Write-Replace Warning Message Request to eNodeBs. The MME shall use the Tracking Area ID list to determine the eNodeBs in the delivery area. If the Tracking Area ID list is not included and no Global eNB ID has been received from the CBC, the message is forwarded to all eNodeBs that are connected to the MME. If a Global eNB ID has been received from the CBC, the MME shall forward the message only to the eNodeB indicated by the Global eNB ID IE.

6. When S1-flex is used the eNodeB may receive same message from multiple MMEs. The eNodeB detects duplicate messages by checking the message identifier and serial number fields within the warning message. If any redundant messages are detected only the first one received will be broadcasted by the cells. The eNodeB shall use the Warning Area information to determine the cell(s) in which the message is to be broadcast. The eNodeBs return a Distribute Warning Message Response to the MME, even if it was a duplicate.

If there is a warning broadcast message already ongoing and the CWM Indicator is included in the Write-Replace Warning Message Request, the eNodeB does not stop existing broadcast message but start broadcasting the new message concurrently. Otherwise the eNodeB shall immediately replace the existing broadcast message with the newer one.

If concurrent warning messages are not supported, this requires the CBE/CBC to take care that 'lower' priority warnings are not sent while a higher priority warning is still being sent.

The eNodeB broadcasts the message frequently according to the attributes set by the CBC that originated the warning message distribution.

7. If the UE has been configured to receive warning messages, and the UE is configured to accept warnings on that PLMN, then the UE proceeds as follows:

The UE can use "warning type" values, 'earthquake', 'tsunami' or 'earthquake and tsunami', immediately to alert the user. When "warning type" is 'test', the UE silently discards the primary notification, but the UE specially designed for testing purposes may proceed with the following procedures.

The UE activates reception of the broadcast messages containing the "warning message".

The UE indicates the contents of the "warning message" to the user.

8. If the Send Warning-Message-Indication parameter was present in the Write-Replace Warning Request and it is configured in the MME based on operator policy, the MME shall forward the Broadcast Scheduled Area Lists in a Write-Replace Warning Indication(s) to the CBC. The Broadcast Scheduled Area List shall contain the Broadcast Completed Area List the MME has received from the eNodeB. The MME may aggregate Broadcast Completed Area Lists it receives from eNodeBs.

Support for sending of Write-Replace Warning Indication (s) to the CBC is optional in the MME.

9. From the Write-Replace Warning Response messages returned by eNodeB's the MME determines the success or failure of the delivery and creates a trace record. Any OMC ID received in step 2 is written to the trace record to permit the O&M system to deliver them to the desired destination.

Warning Message Cancel Procedure

The cancel warning message delivery procedure takes place when CBE requests to stop the on-going broadcast of warning messages.

FIG. 6 is an example of warning message cancel procedure in E-UTRAN to which the present invention may be applied.

1. CBE initiates procedure by sending Stop Emergency Broadcast Request (e.g. "Message Identifier and Serial Number"), to the CBC. The CBC shall authenticate this request.

2. The CBC identifies which MMEs need to be contacted and determines the information to be place into the Warning Area Information Element. The CBC sends a Stop Warning Request message (Message Identifier, Serial Number, Tracking Area ID list, Warning Area, OMC ID, Send Stop Warning Indication) to MMEs.

The message may include an OMC ID. If present, it indicates the OMC to which the Trace record generated in step is destined. Co-location of that OMC with the CBC is an operator option.

The CBC sets the Send Stop Warning Indication element in case the MME is requested to forward the Broadcast Completed Area List in a Stop Warning Indication for the warning message.

3. The MME sends a Stop Warning Confirm message that indicates to the CBC that the MME has started to distribute the Kill Request message to eNodeBs.

If this message is not received by the CBC within an appropriate time period, the CBC can attempt to send Stop Warning Request via another MME in the same pool area.

4. Upon reception of the Stop Warning Confirm messages from the MMEs, the CBC may confirm to the CBE that it has initiated the Warning message cancel procedure.

5. The MME forwards the request from the CBC by Kill Request to eNodeB's. The MME shall use the Tracking Area ID list to determine the eNodeBs that may have warning message broadcast ongoing. In case the Tracking Area ID list is not included the Kill Request is forwarded to all eNodeBs that are connected to the MME.

6. The eNodeB shall stop broadcasting the warning message identified by the Message Identifier and Serial Number in the areas identified by Warning Area IDs. If the Warning Area is absent, it shall be interpreted as "all cells on the eNodeB").

When S1-Flex is used the eNodeB may receive same Kill Request from multiple MMEs, if any redundant Kill Requests are detected only the response to the first MME shall contain statistics related to the cancelled broadcast.

7. If the Send Stop Warning Indication parameter was present in the Stop Warning Request and it is configured in the MME based on operator policy, the MME forwards the Broadcast Cancelled Area List it has received from the eNodeB in a Stop Warning Indication(s) to the CBC. The MME may aggregate Broadcast Cancelled Area Lists it receives from eNodeBs.

If the CBC has requested the MME to send Stop Warning Indications, then the CBC releases the Serial Number of a message after it has stopped receiving the Stop Warning Indications for that message.

8. From the Kill Response messages returned by eNodeB's the MME creates a trace record (e.g. number of times a particular message has been broadcasted in a given warning area) related to the cancelled message. Any OMC ID received in step 2 is written to the trace record to permit the O&M system to deliver them to the desired destination.

Paging-ETWS-Indicator

This parameter indicates that emergency information shall be sent over the paging message.

Warning-Type

This parameter is set when ETWS is used. It has three fields in order to contain warning type value, emergency user alert and popup indications.

The warning type value field indicates the following 5 warning types as its values; earthquake, tsunami, earthquake and tsunami, test, and other. Also, other warning types can be defined in the future if it is required.

The values for this parameter are expressed in 7-bit string. Table 1 shows the values and their corresponding warning types.

TABLE 1

| Warning type Value | Warning type |
|---|---|
| 0000000 | Earthquake |
| 0000001 | Tsunami |
| 0000010 | Earthquake and Tsunami |
| 0000011 | Test |
| 0000100 | Other |
| 0000101-1111111 | Reserved for future use |

The fields for emergency user alert and popup indications are type binary. They are used to command mobile terminals to activate emergency user alert and message popup in order to alert the users upon the reception of ETWS primary notification (e.g. paging message). The codings for the fields are shown below table 2.

TABLE 2

| Field | Emergency User Alert | | Popup | |
|---|---|---|---|---|
| Value | 0 | 1 | 0 | 1 |
| Instruction to Terminal | No instruction as to emergency alert. | Activate emergency user alert. | No instruction as to popup. | Activate popup on the display. |

Emergency user alert includes alerting tone and other user alerting means such as vibration, according to the UE's capability. The types of alert (e.g. the kind of tone, vibration, etc) are implementation dependent and may be subject to regulatory requirements.

The encoding of the Warning-Type parameter is as shown below table 3. The warning type value shall be mutually exclusive and binary encoded.

TABLE 3

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| Warning Type Value | | | | | | | Emergency User Alert | Popup | | Padding | | | | | |

The values of this parameter are sent to the mobile terminals (e.g. over the paging message which remotely activates the UE to receive CBS messages).

Wireless Emergency Alert (WEA)

In the United States, Wireless Emergency Alert (WEA) is the name of Warning Notification and Alert System defined in North America. In the past years, it was also referred to as Commercial Mobile Alert System (CMAS). When an emergency situation happens, alert and warning officials will need to provide the public in an affected area (which can be cell-specific or wider than that) with life-saving information quickly. Wireless Emergency Alerts (WEAs), made available through the Integrated Public Alert and Warning System (IPAWS) infrastructure (or also called EAS (Emergency Alert System)), are one of the possible ways that public safety officials can quickly and effectively alert and warn the public about serious emergency situation or events.

In the United States, the Integrated Public Alert and Warning System (IPAWS) is a modernization and integration of the nation's alert and warning infrastructure and will save time when time matters most, helping the person or people related with or within the affected area or property, protect their life and/or property.

WEAs can be sent by state and local public safety officials, the National Weather Service, the National Center for Missing and Exploited Children, and the President of the United States.

WEAs can be issued for three alert categories imminent threat, AMBER, and presidential
 WEAs look like text messages, but are designed to get your attention and alert you with a unique sound and vibration, both repeated twice
 WEAs are no more than 90 characters, and will include the type and time of the alert, any action you should take, as well as the agency issuing the alert
 WEAs are not affected by network congestion and will not disrupt texts, calls, or data sessions that are in progress
 Mobile users are not charged for receiving WEAs and there is no need to subscribe
 To ensure your device is WEA-capable, check with your service provider WEA shall not interrupt user's texting or phone call which is in progress, and the alert message remains on the phone's notifications received list on many wireless devices.

There are three different kinds of WEA:

1. Presidential Alerts—Issued by the U.S. President or a designee.

2. Imminent Threat Alerts—Includes severe man-made or natural disasters, such as tornadoes, dangerous flooding, shelter in place warnings, etc., where an imminent threat to life or property exists.

3. AMBER Alerts—Help law enforcement search for and locate an abducted child whose life is in danger, under U.S. Department of Justice's criteria.

In 90-characters or less, WEA states who is sending the alert, what is happening, who is affected and what action to take. It is stated by FEMA that WEA is not a text message because it:

Uses a point-to-multipoint system, which means alert messages will be sent to those within a certain area (called Notification Area), unlike text messages that are not location aware. For example, if a Washington, D.C. resident has a WEA-capable device, but happened to be in an area in southern California when an earthquake occurred, the device would receive an "Imminent Threat Alert" (or ETWS message via SIB2).
 Uses a different kind of technology to ensure they are delivered immediately.

Here's how an alert is sent:

Federal, state, local and tribal public safety agencies must apply to FEMA to become alert-originating authorities.
 Once the alert-originators are authorized, FEMA authenticates the sender and the alert.
 FEMA transmits the WEA to the more than 100 participating wireless providers who may have customers in that designated alerting area. Only those customers in that target area receive the alert.

System Information

A UE synchronizes with a cell through the cell discovery procedure, and acquires the physical layer ID of the cell and cell radio frame timing. And, when the UE complete such a procedure successfully, the UE should acquire the cell system information. Generally, the system information means the information that the UE should know in order to access a cell and to properly operate in a network or a specific cell.

The detailed features in relation to the system information may be incorporated by reference to the document 3GPP TS 36.331.

In the LTE/LTE-A system, the basic parameters (e.g., the system information) required for the operation of the UE in the RRC_IDLE mode and the RRC_CONNECTED mode are broadcasted by dividing the parameters into several information blocks.

The system information may be divided into a Master Information Block (MIB) and a plurality of System Information Blocks (SIBs). Hereinafter, the SIB type x (SystemInformationBlockTypex) is simply referred to as 'SIB x'.

Table 4 briefly illustrates the contents included in the system information.

TABLE 4

| System Information | Content |
| --- | --- |
| Master Information Block | Downlink channel bandwidth, PHICH configuration, SFN |
| System Information Block 1 | PLMN ID, tracking area code, cell selection parameters, frequency band, cell barring, other SIB scheduling information |
| System Information Block 2 | Access class barring, RACH, BCCH, PCCH, PRACH, PDSCH, PUSCH, PUCCH parameter, UE timers and constants, uplink carrier frequency |
| System Information Block 3 | cell reselection parameters |
| System Information Block 4 | Intra-frequency neighboring cell information for cell reselection |
| System Information Block 5 | Inter-frequency neighboring cell information for cell reselection |
| System Information Block 6 | UMTS neighboring cell information for cell reselection |
| System Information Block 7 | GERAN neighboring cell information for cell reselection |
| System Information Block 8 | CDMA2000 neighboring cell information for cell reselection |
| System Information Block 9 | Home eNB name |
| System Information Block 10 | ETWS (Earthquake and Tsunami Warning System) primary notification |
| System Information Block 11 | ETWS (Earthquake and Tsunami Warning System) secondary notification |
| System Information Block 12 | CMAS (Commercial Mobile Alert System) warning notification |
| System Information Block 13 | MBMS (Multimedia Broadcast Multicast Service)-related information |
| System Information Block 14 | EAB (Extended Access Barring) for access control |
| System Information Block 15 | information related to mobility procedures for MBMS reception |
| System Information Block 16 | information related to GPS (Global Positioning System) time and UTC (Coordinated Universal Time) |
| System Information Block 17~21 | |

Referring to Table 4, the MIB includes the parameter that is the most essential, limited and required for obtaining other information from a cell and the most frequently transmitted.

The MIB includes the information for a DL cell bandwidth. In the MIB, 4 bits are used for indicating the DL bandwidth, and may indicate different bandwidths up to 16.

In addition, the MIB includes the information of the PHICH configuration of a cell. A UE should know the PHICH configuration in order to receive the L1/L2 control signaling on the PDCCH which is required for receiving a DL-SCH (i.e., the PDSCH). In the MIB, 3 bits indicate the information of the PHICH configuration; herein, 1 bit represents whether the PHICH duration occupies one OFDM symbol or three OFDM symbols, and the remaining 2 bits notify the amount of reserved resource for the PHICH in the control region.

In addition, the MIB includes the system frame number (SFN) of the radio frame on which the corresponding MIB is transmitted.

SIB 1 includes the information in relation to a cell access (a PLMN ID, a tracking area code, a cell selection parameter and a frequency band), and particularly, includes the scheduling information of other SIBs except SIB 1.

In addition, each of the system information is provided to a UE by being distinguished into information blocks.

The SIB numbers, the contents included in each SIB, and the like that are illustrated in Table 2 are just an example, but the present invention is not limited thereto.

FIG. 7 exemplifies a transmission of the system information in a wireless communication system to which the present invention can be applied.

Referring to FIG. 7, the MIB uses the fixed schedule that has the period of 40 ms, and is repeated within the period of 40 ms. The first transmission of the MIB is scheduled in subframe #0 of the radio frame of which System Frame Number (SFN) mod 4=0, and repeated in subframe #0 of all of other radio frames within the period of 40 ms.

SIB 1 uses a fixed schedule that has a 80 ms period and is repeated within the 80 ms period. The first transmission of SIB 1 is scheduled in subframe #5 of the radio frame of which SFN mod 8=0, and repeated in subframe #5 of all of other radio frames of which SFN mod 2=0 within the 80 ms period.

A network may provide SIB 1 that includes the same parameter value through the dedicated signaling (e.g., RRC Connection Reconfiguration message) as well as broadcasts the SIB.

The SIBs except SIB 1 is delivered in the system information (SI) message.

The mapping in the SI message of the SIB may be configured by the scheduling information list (schedulingInfoList) included in SIB 1. The scheduling information list (schedulingInfoList) includes the scheduling information (schedulingInfo) of each SI message, and the scheduling information (schedulingInfo) includes the transmission period (si-Periodicity) of the SI message and the SIB mapping information (sib-MappingInfor).

In this case, each SIB is included only in a single SI message and once in the corresponding SI message. The SIBs including the same scheduling requirement (e.g., transmission period) may be mapped to the same SI message. SIB 2 (SystemInformationBlockType2) is always mapped to the SI message that corresponds to the first message in the list of the SI messages in the scheduling information list. The multiple SI messages are transmitted in the same period.

The SI message is transmitted in the window in a time domain (hereinafter, referred to as 'SI window') using a dynamic scheduling. SIB 1 configures a SI window length (si-WindowLength).

Each SI message is in relation to a single SI window, and the SI windows of different SI messages are not overlapped. That is, only one SI message is transmitted in a single SI window.

The length of the SI window is the same for all SI messages. In the SI window, the corresponding SI message may be transmitted several times in the radio frame of MBSFN subframe, UL subframe in TDD and the subframe except subframe #5 of radio frames of which SFN mod 2=0.

The system information is commonly applied to all UEs accessed in a cell, and a UE should maintain the newest system information always for the proper operation. In the case that the system information is changed, a UE should know the time when an eNB transmits new system information.

As described above, in order to notify that the system information is changed or in order to trigger a UE so as to reacquire the system information, a paging message may be used.

The change of the system information (except the ETWS, CMAS and EAB parameters) occurs only in a specific radio frame. That is, a modification period is used. The system information is transmitted several times with the same contents within the modification period. The boundary of the modification period is defined as the SFN value, SFN mod=0. Herein, m is a radio frame number that configures the modification period. The modification period is configured by the system information.

FIG. 8 is a view illustrating the modification of the system information in a wireless communication system to which the present invention can be applied.

When a network modifies (a part of) the system information, the modification is notified to the first UE. That is, the modification is performed within a modification period. In the next modification period, the network transmits updated system information. The different shades in FIG. 8 represent different types of system information. In the case of receiving the modification notification, a UE acquires new system information immediately after the next modification period is started. The UE applies the system information which is previously acquired until acquiring new system information.

A paging message is used in order to notify the modification of the system information to the UE in the RRC_IDLE mode and the UE in the RRC_CONNECTED mode. When the UE receives a paging message that includes a system information modification (systemInfoModification) field, the UE knows that the system information is to be changed in a boundary of the next modification period. However, even though the UE receives the information of the modification within the system information, any further detailed information such as which system information is changed is not provided to the UE.

SIB 1 includes a system information value tag (systemInfoValueTag) indicating that a modification is occurred in the SI message. The UE may use the system information value tag in order to check whether the SI message which is previously stored is still valid (e.g., the case of returning to coverage from exterior, etc.). In addition, the UE may regard the system information as not valid in the case that three hours have passed since the time when the UE successfully checks the system information stored is valid.

When a part of the system information (e.g., the parameter (SIB 8 and SIB 16) which is regularly changed such as the ETWS information, the CMAS information and the time information, and the EAB parameter) is changed, the network may not update the system information value tag. Similarly, when a part of the system information is changed, the network may not include a system information modification (systemInfoModification) field within a paging message.

In the case that the systemInfoValueTag in SIB 1 is checked after the modification period boundary is passed or a paging is not received, by trying to find a system information modification (systemInfoModification) indication as much as at least a modificationPeriodCoeff number (e.g., 2, 4, 8 and 16) during the modification period in every modification period, the UE may check the stored system information to be valid.

In the case that the UE fails to receive the paging message during the modification period, the UE may assume that the system information will not be changed in the next modification period boundary. When the UE in the RRC_CONNECTED mode receives a paging message during the modification period, the UE may determine whether the system information except the ETWS information, the CMAS information and the EAB parameter is going to be modified in the next modification period according to the presence of the system information modification (systemInfoModification).

The UE in the RRC_CONNECTED mode which is available to support the ETWS and/or the CMAS tries to read the paging at least once in every default paging cycle (defaultPagingCycle) in order to check whether the ETWS and/or CMAS notification is existed.

Hereinafter, the modification notification of the ETWS, CMAS and EAB parameters will be described in more detail.

The ETWS primary notification and/or the ETWS secondary notification may be occurred in any times. The paging message may be used in order to notify whether the ETWS primary notification and/or the ETWS secondary notification are existed to the UEs in the RRC_IDLE mode and the RRC_CONNECTED mode which are available to support the ETWS.

When the UE receives the paging message that includes an ETWS indication, the UE starts to receive the ETWS primary notification and/or the ETWS secondary notification according to the scheduling information list (schedulingInfoList) included in SIB 1.

In the case that the UE receives the paging message that includes an ETWS indication during acquiring the ETWS notification(s), the UE continues acquiring the ETWS notification(s) according to the scheduling information list (schedulingInfoList) which is previously acquired until reacquiring the scheduling information list (schedulingInfoList) in SIB 1.

The UE is not required to check periodically the scheduling information list (schedulingInfoList) included in SIB 1. However, when receiving the paging message that includes the ETWS indication, the UE reacquires the scheduling information list (schedulingInfoList) included in SIB 1 in order to check the scheduling modification for SIB 10 and SIB 11.

In the case that the ETWS is no more scheduled, the UE may receive the paging message that includes the ETWS indication and/or the system information modification (systemInfoModification), or may not receive it.

The ETWS primary notification is included in SIB 10, and the ETWS secondary notification is included in SIB 11. The ETWS secondary notification may be delivered with being segmented. The segmentation which is applied to a transmission of the ETWS secondary notification in a cell is fixed. That is, the ETWS secondary notification has the same segmentation size that includes the same message identifier (messageIdentifier), serial number (serialNumber) and warning message segment number (warningMessageSegmentNumber). The ETWS secondary notification corresponds to a single cell broadcasting (CB) data. This will be described in detail below.

The CMAS notification may be occurred in any times. The paging message may be used in order to notify whether the one or more CMAS notifications are existed to the UEs in the RRC_IDLE mode and the RRC_CONNECTED mode which are available to support the CMAS.

When the UE receives the paging message that includes a CMAS indication, the UE starts to receive the CMAS notification according to the scheduling information list (schedulingInfoList) included in SIB 1.

In the case that the UE receives the paging message that includes an CMAS indication during acquiring the CMAS notification(s), the UE continues acquiring the CMAS notification(s) according to the scheduling information list (schedulingInfoList) which is previously acquired until reacquiring the scheduling information list (schedulingInfoList) in SIB 1.

The UE is not required to check periodically the scheduling information list (schedulingInfoList) included in SIB 1. However, when receiving the paging message that includes the CMAS indication, the UE reacquires the scheduling information list (schedulingInfoList) included in SIB 1 in order to check the scheduling modification for SIB 12.

In the case that SIB 12 is no more scheduled, the UE may receive the paging message that includes the ETWS indication and/or the system information modification (systemInfoModification), or may not receive it.

The CMAS notification is included in SIB 12. The CMAS notification may be delivered with being segmented. The segmentation which is applied to the transmission of the CMAS notification in a cell is fixed. That is, the CMAS notification has the same segmentation size that includes the same message identifier (messageIdentifier), serial number (serialNumber) and warning message segment number (warningMessageSegmentNumber). The network does not apply the interleaving in the transmission of the CMAS notification. That is, all segments of the CMAS notification is transmitted before the segment of another CMAS notification. The CMAS notification corresponds to a single cell broadcasting (CB) data. This will be described in detail below.

The EAB parameter modification may be occurred in any times. The EAB parameter is included in SIB 14. The paging message may be used in order to notify that the modification of the EAB parameter or SIB 14 is no more scheduled to the UE in the RRC_IDLE mode which is available to support the EAB.

When the UE receives the paging message that includes the EAB parameter modification (eab-ParamModification), the UE starts to receive SIB 14 according to the scheduling information list (schedulingInfoList) included in SIB 1.

In the case that the UE receives the paging message that includes the EAB parameter modification (eab-ParamModification) during acquiring SIB 14, the UE continues acquiring SIB 14 according to the scheduling information list (schedulingInfoList) which is previously acquired until reacquiring the scheduling information list (schedulingInfoList) included in SIB 1.

FIG. 9 is a view illustrating a system information acquisition procedure in a wireless communication system to which the present invention can be applied.

A UE uses the system information acquisition procedure in order to acquire the access stratum (AS) and non-access stratum (NAS) system information which is broadcasted by a network. The system information acquisition procedure is applied to both of the UE in the RRC_IDLE mode and the UE in the RRC_CONNECTED mode.

The UE starts the system information acquisition procedure when completing a cell selection (e.g., when turning on the UE), a cell reselection and handover, when entering another Radio Access Technology (RAT), when entering in the coverage from exterior, when receiving a notification indicating that the system information is modified, when receiving an indication that an ETWS notification is existed, when receiving an indication that a CMAS notification is existed, when receiving an indication that an EAB parameter is modified and when a maximum validity duration is elapsed.

Referring to FIG. 8, the UE receives the MIB from the network (step, S901).

The MIB is mapped to the BCCH and transmitted in the BCH/PBCH. As described above, the MIB is scheduled in subframe #0 of the radio frame of which SFN mod 4=0, and which is repeated in subframe #0 of all other radio frames in the corresponding period. And, the PBCH occupies 72 subcarriers on the center of first four OFDM symbols in the second slot of subframe #0 of a radio frame.

The UE receives SIB 1 from the network using the parameter received from the MIB (step, S902). And, the UE receives the system information of the network based on the scheduling information list (schedulingInfoList) acquired from SIB 1 (step, S903).

SIB 1 is scheduled in subframe #5 of the radio frame of which SFN mod 8=0, and which is repeated in subframe #5 of all other radio frames of which SFN mod 2=2 within 80 ms period.

On the other hand, the remaining SIB except SIB 1 is transmitted by being mapped to the SI for each SIB that has the same transmission period. As described above, the SI window length and the SI message transmission period are scheduled in SIB 1.

All SIBs are mapped to the BCCH and transmitted in the DL-SCH/PDSCH. The PDCCH for the SIB delivers the DCI to which the CRC scrambled by the system information-RNTI (SI-RNTI) is attached, and identifies the PDSCH that delivers the SIB from the PDCCH. The PDSCH resource allocation information for the SIB uses DCI formats 1A and 1C. That is, DCI formats 1A and 1C are scrambled by the SI-RNTI.

The UE may acquire the detailed time domain scheduling (and other information, for example, frequency domain scheduling, a transmission format which is used, etc.) of the PDSCH that delivers the SI message by decoding the SI-RNTI on the PDCCH. One SI-RNTI is used for addressing all SI messages not only SIB 1.

The UE may overwrite the system information acquired through the system information acquisition procedure on the system information which is already stored.

Tables 5 to 7 illustrate existing Method(s) for WEA (CMAS) or other Warning Notification (e.g., ETWS).

The following information element definition of below tables 5 to 7 is used for transport of CMAS information from eNB to UE.

Value(s) of some information element component(s) (e.g., messageIdentifier) is defined not by eNB but by MME or by the operator.

Tables 5 to 7 are format of a System Information Block Type12.

The IE SystemInformationBlockType12 contains a CMAS notification.

TABLE 5

```
-- ASN1START
SystemInformationBlockType12-r9 ::=SEQUENCE {
    messageIdentifier-r9        BIT STRING (SIZE (16)),
    serialNumber-r9             BIT STRING (SIZE (16)),
    warningMessageSegmentType-r9 ENUMERATED {notLastSegment,
lastSegment},
    warningMessageSegmentNumber-r9  INTEGER (0..63),
    warningMessageSegment-r9    OCTET STRING,
    dataCodingScheme-r9         OCTET STRING (SIZE (1))
                                OPTIONAL,
    lateNonCriticalExtension    OCTET STRING
                                OPTIONAL,
    ...
}
-- ASN1STOP
```

TABLE 6

SystemInformationBlockType12 field descriptions dataCodingScheme
Identifies the alphabet/coding and the language applied
variations of a CMAS notification. The octet (which is
equivalent to the octet of the equivalent IE defined in 3GPP
TS 36.413) contains the octet of the equivalent IE defined in
3GPP TS 23.041 and encoded according to 3GPP TS 23.038.
messageIdentifier
Identifies the source and type of CMAS notification. The
leading bit (which is equivalent to the leading bit of the
equivalent IE defined in 3GPP TS 36.413) contains bit 7 of
the first octet of the equivalent IE, defined in and encoded
according to 3GPP TS 23.041, while the trailing bit contains
bit 0 of second octet of the same equivalent IE.
serialNumber
Identifies variations of a CMAS notification. The leading bit
(which is equivalent to the leading bit of the equivalent IE
defined in 3GPP TS 36.413) contains bit 7 of the first octet
of the equivalent IE, defined in and encoded according to
3GPP TS 23.041, while the trailing bit contains bit 0 of
second octet of the same equivalent IE.
warningMessageSegment
Carries a segment of the Warning Message Contents IE defined
in 3GPP TS 36.413. The first octet of the Warning Message
Contents IE is equivalent to the first octet of the CB data
IE defined in and encoded according to 3GPP TS 23.041 and so
on.
warningMessageSegmentNumber
Segment number of the CMAS warning message segment contained
in the SIB. A segment number of zero corresponds to the first
segment, one corresponds to the second segment, and so on.
warningMessageSegmentType
Indicates whether the included CMAS warning message segment
is the last segment or not.

TABLE 7

| Conditional presence | Explanation |
| --- | --- |
| Segment1 | The field is mandatory present in the first segment of SIB12, otherwise it is not present. |

Hereinafter, a method for transceiving a warning message by using a PDS (Pre-Defined String) according to the present invention will be described.

Definition of PDS (Pre-Defined String)

First, a PDS (Pre-Defined String) will be described.

A PDS refers to a pre-defined string or information to inform a UE or a user about occurrence of an emergency visually by using an image or an icon, audibly by using a sound, or tactilely by using a vibration.

Unlike conventional warning messages displayed in the form of text, the PDS refers to the information displayed visually (an image or an icon), audibly (a sound), or tactilely (a vibration) so that even illiterates or foreigners may immediately recognize occurrence of an emergency.

An MNO (Mobile Network Operator) or an operator may provide the PDS.

Serving cells served by the same MNO or operator may use the same PDS(s), and different countries may define different PDS(s).

A PDS in a PDS set may have the same string length as other PDSs belonging to the PDS set or may have a different string length from those of the other PDSs.

If PDSs belonging to a PDS set have the same string length, the PDS set may be expressed by Eq. 1 below.

$$[PDS\ \#1, PDS\ \#2, \ldots, PDS\ \#(N1)] \quad \text{[Equation 1]}$$

In Eq. 1, N1 represents the number of PDSs in the PDS set, and N2 represents the length of a PDS.

The lengths of the PDSs in the PDS set of Eq. 1 are all equal to N2.

If PDSs in a PDS set have different string lengths, the PDS set may be expressed as Eq. 2 below.

$$[\text{length of PDS\#1(denoted by 'L1')}, PDS\#1:\ L1]$$

$$[\text{length of PDS\#2(denoted by 'L2')}, PDS\#2:\ L2]$$

$$\ldots$$

$$[\text{length of PDS\#(N1)(denoted by 'N1')}, PDS\#(N1):\ L(N1)] \quad \text{[Equation 2]}$$

Here, N1 represents the number of PDSs, and L(N1) represents the length of the (N1)-th PDS.

For example, in one octet (or one byte), value 0 represents length K, and value 1 represents length $2^{\wedge}(K)$. K is a whole number (including zero).

Method for Transceiving a Warning Message by Using a PDS

Next, described will be a method for transceiving a warning message by using the PDS defined previously.

FIG. 10 is a flow diagram illustrating a method for transceiving a warning message by using a PDS according to the present invention.

First, an eNB transmits first control information indicating the use of a PDS set including at least one PDS (Pre-Defined String) for a Public Warning System (PWS) to a UE S1001.

Here, the eNB may be denoted as a serving network.

As one example, the first control information may be represented by EmergencyAlertPredefinedStingSupport and may be a 1-bit indication (indicator) having a value of either '0' or '1'.

Also, the first control information may be transmitted to the UE through an attach procedure involving the UE and the eNB.

The attach procedure may include a roaming procedure.

Also, the first control information may be broadcast by using a System Information Block (SIB).

A Cell Broadcast Entity (CBE) transmits the first control information to an MME, and the MME transmits the first control information to the eNB.

If the MME receives the first control information, the MME transmits the received first control information to the eNB(s) managed by the MME.

Afterwards, the eNB(s) may enable or disable the first control information for SIB1.

The use of a PDS set in the eNB (or serving network) may be indicated by whether the use of the PDS set is enabled or disabled.

Therefore, the eNB may have a PDS-enable mode or a PDS-disable mode depending on whether the eNB uses or supports the PDS set.

In this case, the first control information may be interpreted as PDS mode information indicating the enable or disable mode of the PDS set.

For example, the first control information or PDS mode information may indicate the PDS-enable mode or PDS-disable mode.

In other words, the PDS-enable mode may indicate a mode in which a PDS set is used in an eNB or support (or use) of the PDS set is enabled. The PDS-disable mode may indicate a mode in which a PDS set is not used in the eNB or support (or use) of the PDS set is disabled.

If a UE receives string 0 in the PDS-enable mode, the UE displays predefined information for the string 0 instead of displaying a raw string of the string 0.

For example, the raw string of the string 0 may represent 'HELLO', and the predefined string of the string 0 may represent a specific image or a specific icon for an earthquake.

If the UE receives string 0 in the PDS-disable mode, the UE simply displays a raw string ('HELLO') of the string 0.

For example, in case the first control information is set to '1', it may indicate the PDS-enable mode. In case the first control information is set to '0', it may indicate the PDS-disable mode.

Tables 8 and 9 below illustrate one example of SIB1 format including the first control information.

TABLE 8

```
-- ASN1START
SystemInformationBlockType1-BR-r13 ::=SystemInformationBlockType1
SystemInformationBlockType1 ::=     SEQUENCE {
   cellAccessRelatedInfo             SEQUENCE {
      plmn-IdentityList              PLMN-IdentityList,
      trackingAreaCode               TrackingAreaCode,
      cellIdentity                   CellIdentity,
      cellBarred                     ENUMERATED {barred, notBarred},
      intraFreqReselection           ENUMERATED {allowed, notAllowed},
      csg-Indication                 BOOLEAN,
      csg-Identity                   CSG-Identity       OPTIONAL -- Need OR
   },
   cellSelectionInfo                 SEQUENCE {
      q-RxLevMin                     Q-RxLevMin,
      q-RxLevMinOffset               INTEGER (1..8)     OPTIONAL --
Need OP
   },
   p-Max                             P-Max                         OPTIONAL,      --
Need OP
      freqBandIndicator              FreqBandIndicator,
      schedulingInfoList             SchedulingInfoList,
      tdd-Config                     TDD-Config                    OPTIONAL, --
Cond TDD
      si-WindowLength                ENUMERATED {
                                     ms1, ms2, ms5, ms10, ms15, ms20,
                                     ms40},
      systemInfoValueTag             INTEGER (0..31),
      nonCriticalExtension           SystemInformationBlockType1-v890-IEs
      OPTIONAL
}
SystemInformationBlockType1-v890-IEs::=   SEQUENCE {
   lateNonCriticalExtension          OCTET STRING (CONTAINING
SystemInformationBlockType1-v8h0-IEs)    OPTIONAL,
   nonCriticalExtenston              SystemInformationBlockType1-v920-IEs
   OPTIONAL
}
-- Late non critical extensions
SystemInformationBlockType1-v8h0-IEs ::= SEQUENCE {
   multiBandInfoList                 MultiBandInfoList     OPTIONAL, -- Need
OR
   nonCriticalExtenston              SystemInformationBlockType1-v9e0-IEs
   OPTIONAL
}
SystemInformationBlockType1-v9e0-IEs ::= SEQUENCE {
   freqBandIndicator-v9e0            FreqBandIndicator-v9e0   OPTIONAL, --
Cond FBI-max
   multiBandInfoList-v9e0            MultiBandInfoList-v9e0   OPTIONAL, --
Cond mFBI-max
   nonCriticalExtension              SystemInformationBlockType1-v10j0-IEs
   OPTIONAL
}
SystemInformationBlockType1-v10j0-IEs ::= SEQUENCE {
   freqBandInfo-r10                  NS-PmaxList-r10                OPTIONAL, --
Need OR
   multiBandInfoList-v10j0           MultiBandInfoList-v10j0
   OPTIONAL, -- Need OR
   nonCriticalExtenston              SEQUENCE { }              OPTIONAL
}
-- Regular non critical extensions
SystemInformationBlockType1-v920-IEs ::= SEQUENCE {
   ims-EmergencySupport-r9           ENUMERATED {true}          OPTIONAL, -
```

TABLE 8-continued

```
- Need OR
    pws-EmergencyAlertPredefinedStingSupport-r15       ENUMERATED {true}
    cellSelectionInfo-v920         CellSelectionInfo-v920    OPTIONAL, --
Cond RSRQ
    nonCriticalExtenston           SystemInformationBlockType1-v1130-IEs
    OPTIONAL
}
SystemInformationBlockType1-v1130-IEs ::= SEQUENCE {
    tdd-Config-v1130               TDD-Config-v1130          OPTIONAL, -- Cond
TDD-OR
    cellSelectionInfo-v1130        CellSelectionInfo-v1130   OPTIONAL, -
- Cond WB-RSRQ
    nonCriticalExtenston           SystemInformationBlockType1-v1250-IEs
    OPTIONAL
}
SystemInformationBlockType1-v1250-IEs ::= SEQUENCE {
    cellAccessRelatedInfo-v1250            SEQUENCE {
        category0Allowed-r12               ENUMERATED {true}         OPTIONAL
    },
    cellSelectionInfo-v1250        CellSelectionInfo-v1250
    OPTIONAL, -- Cond RSRQ2
    freqBandIndicatorPriority-r12  ENUMERATED {true}
    OPTIONAL, -- Cond mFBI
    nonCriticalExtenston           SystemInformationBlockType1-v1310-IEs
    OPTIONAL
}
SystemInformationBlockType1-v1310-IEs ::= SEQUENCE {
    hyperSFN-r13                   BIT STRING (SIZE (10))    OPTIONAL, -
- Need OR
    eDRX-Allowed-r13               ENUMERATED {true}
    OPTIONAL, -- Need OR
    cellSelectionInfoCE-r13        CellSelectionInfoCE-r13
    OPTIONAL, -- Need OP
    bandwidthReducedAccessRelatedInfo-r13 SEQUENCE {
        si-WindowLength-BR-r13             ENUMERATED {
                                           ms20, ms40, ms60, ms80, ms120,
                                           ms160, ms200, spare},
        si-RepetitionPattern-r13           ENUMERATED {everyRF, every2ndRF,
every4thRF,
                                                 every8thRF},
        schedulingInfoList-BR-r13          SchedulingInfoList-BR-r13
    OPTIONAL, -- Need OR
        fdd-DownlinkOrTddSubframeBitmapLC-r13 CHOICE {
            subframePattern10-r13          BIT STRING (SIZE (10)),
            subframePattern40-r13          BIT STRING (SIZE (40))
        }                                                    OPTIONAL,  -
- Need OP
        fdd-UplinkSubframeBitmapLC-r13     BIT STRING (SIZE (10))
    OPTIONAL,   -- Need OP
        startSymbolLC-r13                  INTEGER (1..4),
        si-HoppingConfigCommon-r13         ENUMERATED {on,off},
        si-ValidityTime-r13                ENUMERATED {true} OPTIONAL,
        systemInfoValueTagList-r13         SystemInfoValueTagList-r13
    OPTIONAL -- Need OR
    }                                                        OPTIONAL, -- Cond BW-
reduced
    nonCriticalExtension           SEQUENCE { }              OPTIONAL
}
PLMN-IdentityList ::=          SEQUENCE (SIZE (1..maxPLMN-r11)) OF
PLMN-IdentityInfo
PLMN-IdentityInfo ::=          SEQUENCE {
    plmn-Identity                  PLMN-Identity,
    cellReservedForOperatorUse         ENUMERATED {reserved,
notReserved}
}
SchedulingInfoList ::= SEQUENCE (SIZE (1..maxSI-Message)) OF SchedulingInfo
SchedulingInfo ::= SEQUENCE {
    si-Periodicity                 ENUMERATED {
                                   rf8, rf16, rf32, rf64, rf128, rf256,
rf512},
    sib-MappingInfo                SIB-MappingInfo
}
SchedulingInfoList-BR-r13 ::= SEQUENCE (SIZE (1..maxSI-Message)) OF
SchedulingInfo-BR-r13
SchedulingInfo-BR-r13 ::= SEQUENCE {
    si-Narrowband-r13              INTEGER (1..maxAvailNarrowBands-r13),
    si-TBS-r13                     ENUMERATED {b152, b208, b256, b328, b408,
b504, b600, b712,
                                   b808, b936}
}
```

TABLE 8-continued

```
SIB-MappingInfo ::= SEQUENCE (SIZE (0..maxSIB-1)) OF SIB-Type
SIB-Type ::=                ENUMERATED {
                               sibType3, sibType4, sibType5, sibType6,
                               sibType7, sibType8, sibType9, sibType10,
                               sibType11, sibType12-v920, sibType13-v920,
                               sibType14-v1130, sibType15-v1130,
                               sibType16-v1130, sibType17-v1250,
sibType18-v1250,
                               ..., sibType19-v1250, sibType20-v1310}
SystemInfoValueTagList-r13 ::=    SEQUENCE (SIZE (1..maxSI-Message)) OF
SystemInfoValueTagSI-r13
SystemInfoValueTagSI-r13 ::=      INTEGER (0..3)
CellSelectionInfo-v920 ::=        SEQUENCE {
   q-QualMin-r9                   Q-QualMin-r9,
   q-QualMinOffset-r9             INTEGER (1..8)          OPTIONAL
}
CellSelectionInfo-v1130 ::=       SEQUENCE {
   q-QualMinWB-r11                Q-QualMin-r9
}
CellSelectionInfo-v1250 ::=       SEQUENCE {
   q-QualMinRSRQ-OnAllSymbols-r12           Q-QualMin-r9
}
-- ASN1STOP
```

TABLE 9

SystemInformationBlockType1 field descriptions bandwithReducedAccessRelatedInfo
Access related information for BL UEs and UEs in CE.
category0Allowed
The presence of this field indicates category 0 UEs are
allowed to access the cell.
cellBarred
barred means the cell is barred.
cellIdentity
Indicates the cell identity.
cellReservedForOperatorUse
As defined in TS 36.304.
cellSelectionInfoCE
Cell selection information for BL UEs and UEs in CE.
csg-Identity
Identity of the Closed Subscriber Group the cell belongs to.
csg-Indication
If set to TRUE the UE is only allowed to access the cell if
it is a CSG member cell, if selected during manual CSG
selection or to obtain limited service.
eDRX-Allowed
The presence of this field indicates if idle mode extended
DRX is allowed in the cell. The UE shall stop using extended
DRX in idle mode if eDRX-Allowed is not present.
fdd-DownlinkOrTddSubframeBitmapLC
The set of valid subframes for FDD downlink or TDD
transmissions.
If the field is not present, then non-MBSFN subframes are
considered as valid subframes for FDD downlink or TDD
transmissions. If no MBSFN configuration is indicated then
all downlink subframes are considered as valid subframes for
downlink transmission, and all downlink subframes are
considered as valid subframes for downlink transmission, and
all uplink subframes are considered as valid subframes for
TDD uplink transmissions.
fdd-UplinkSubframeBitmapLC
The set of valid subframes for FDD uplink transmissions for
BL UEs.
If the field is not present, then UE considers all uplink
subframes as valid subframes for FDD uplink transmissions.
freqBandIndicatorPriority
If the field is present and supported by the UE, the UE shall
prioritize the frequency bands in the multiBandInfoList IE in
decreasing priority order. Only if the UE does not support
any of the frequency bands in multiBandInfoList, the UE shall
use the value in freqBandIndicator IE. Otherwise, the UE
applies frequency band according to the rules defined in
multiBandInfoList.
freqBandInfo
A list of additionalPmax and additionalSpectrumEmission TABLE 9-continued SystemInformationBlockType1 field descriptions values for the frequency band in freqBandIndicator.
hyperSFN
Indicates hyper SFN which increments by one when the SFN
wraps around.
ims-EmergencySupport
Indicates whether the cell supports IMS emergency bearer
services for UEs in limited service mode. If absent, IMS
emergency call is not supported by the network in the cell
for UEs in limited service mode.
pws-EmergencyAlertPredefinedStingSupport
Indicates (by the cell) whether the Mobile Network Operator
supports the use of pre-defined strings for Public Warning
System.
intraFreqReselection
Used to control cell reselection to intra-frequency cells
when the highest ranked cell is barred, or treated as barred
by the UE.
multiBandInfoList
A list of additional frequency band indicators, as defined in
TS 36.101 [42, table 5.5-1] that the cell belongs to. If the
UE supports the frequency band in the freqBandIndicator IE it
shall apply that frequency band. Otherwise, the UE shall
apply the first listed band which it supports in the
multiBandInfoList IE. If E-UTRAN includes multiBandInfoList-
v9e0 it includes the same number of entries, and listed in
the same order, as in multiBandInfoList (i.e. without
suffix). See Annex D for more descriptions. The UE shall
ignore the rule defined in this field description if
freqBandIndicatorPriority is present and supported by the UE.
multiBandInfoList-v10j0
A list of additionalPmax and additionalSpectrumEmission
values for the frequency bands in multiBandInfoList (i.e.
without suffix) and multiBandInfoList-v9e0. If E-UTRAN
includes multiBandInfoList-v10j0, it includes the same number
of entries, and listed in the same order, as in
multiBandInfoList (i.e. without suffix).
plmn-IdentityList
List of PLMN identities. The first listed PLMN-Identity is
the primary PLMN.
p-Max
Value applicable for the cell. If absent the UE applies the
maximum power according to the UE capability.
q-QualMin
Parameter "Qqualmin". If cellSelectionInfo-v920 is not
present, the UE applies the (default) value of negative
infinity for Qqualmin.
q-QualMinRSRQ-OnAllSymbols
If this field is present and supported by the UE, the UE
shall, when performing RSRQ measurements, perform RSRQ TABLE 9-continued SystemInformationBlockType1 field descriptions measurement on all OFDM symbols.
q-QualMinOffset
Parameter "Qqualminoffset". Actual value Qqualminoffset = IE
value [dB]. If cellSelectionInfo-v920 is not present or the
field is not present, the UE applies the (default) value of 0
dB for Qqualminoffset. Affects the minimum required quality
level in the cell.
q-QualMinWB
If this field is present and supported by the UE, the UE
shall, when performing RSRQ measurements, use a wider
bandwidth.
q-RxLevMinOffset
Parameter Qrxlevminoffset. Actual value Qrxlevminoffset = IE
value * 2 [dB]. If absent, the UE applies the (default) value
of 0 dB for Qrxlevminoffset. Affects the minimum required Rx
level in the cell.
sib-MappingInfo
List of the SIBs mapped to this SystemInformation
message. There is no mapping information of SIB2; it is always
present in the first SystemInformation message listed in the
schedulingInfoList list.
si-HoppingConfigCommon
Frequency hopping activation/deactivation for BR versions of
SI messages and MPDCCH of paging.
si-Narrowband
This field indicates the index of the narrowband used to
broadcast the SI message towards low complexity UEs and UEs
supporting CE.
si-RepetitionPattern
Indicates the radio frames within the SI window used for SI
message transmission. Value everyRF corresponds to every
radio frame, Value every2ndRF corresponds to every second
radio frame, and so on.
si-Periodicity
Periodicity of the SI-message in radio frames, such that rf8
denotes 8 radio frames, rf16 denotes 16 radio frames, and so
on.
si-TBS
This field indicates the transport block size information
used to broadcast the SI message towards low complexity UEs
and UEs supporting CE. Refer to 3GPP TS 36.213 and Table
7.1.7.2.1-1 for a 6 PRB bandwidth and a QPSK modulation.
schedulingInfoList-BR
Indicates additional scheduling information of SI messages
for BL UEs and UE in CE. It includes the same number of
entries, and listed in the same order, as in
SchedulingInfoList (without suffix).
si-ValidityTime
Indicates system information validity timer. If set to TRUE,
the timer is set to 3 h, otherwise the timer is set to 24 h.
si-WindowLength, si-WindowLength-BR
Common SI scheduling window for all SIs. Unit in
milliseconds, where ms1 denotes 1 millisecond, ms2 denotes 2
milliseconds and so on. In case si-WindowLength-BR-r13 is
present and the UE is a BL UE or a UE in CE, the UE shall use
si-WindowLength-BR-r13 and ignore the original field si-
WindowLength (without suffix). UEs other than BL UEs or UEs
in CE shall ignore the extension field si-WindowLength-BR-
r13.
startSymbolLC
For BL and UEs in CE, indicates the OFDM starting symbol for
any MPDCCH, PDSCH scheduled on the same cell except the PDSCH
carrying SystemInformationBlockType1-BR. Values 1, 2, and 3
are applicable for dl-Bandwidth greater than 10 resource
blocks. Values 2, 3, and 4 are applicable otherwise.
systemInfoValueTagList
Indicates SI message specific value tags for BL UEs and UE in
CE. It includes the same number of entries, and listed in the
same order, as in SchedulingInfoList (without suffix).
systemInfoValueTagSI
SI message specific value tag. Common for all SIBs within the
SI message other than MIB, SIB1, SIB10, SIB11, SIB12 and
SIB14.
systemInfoValueTag
Common for all SIBs other than MIB, SIB1, SIB10, SIB11, SIB12
and SIB14. Change of MIB and SIB1 is detected by acquisition
of the corresponding message.
tdd-Config
Specifies the TDD specific physical channel configurations.
trackingAreaCode
A trackingAreaCode that is common for all the PLMNs listed.

Next, the eNB broadcasts second control information related to configuration of the PDS set to a UE S1002.

In the same manner, the corresponding procedure may be performed in the attach procedure including roaming.

Here, the UE stores a PDS set received from the eNB.

If the UE receives SIB1 including first control information (for example, pws-EmergencyAlertPredefinedSting-Support) indicating that the use (or support) of a PDS set of the eNB is enabled but does not have second control information related to configuration of the PDS set, the UE confirms the PDS set and receives the second control information from the eNB by using SIB2.

The second control information may include a PWS-PreDefinedStrings field specifying a PDS set, a pws-NumberOfStrings field representing the number of PDSs within the PDS set, and a pws-String field representing each PDS of the PDS set.

Tables 10 and 11 below illustrate one example of an SIB2 format including the second control information.

TABLE 10

```
-- ASN1START
SystemInformationBlockType2 ::=    SEQUENCE {
    ac-BarringInfo                 SEQUENCE {
        ac-BarringForEmergency         BOOLEAN,
        ac-BarringForMO-Signalling     AC-BarringConfig
OPTIONAL, -- Need OP
        ac-BarringForMO-Data           AC-BarringConfig        OPTIONAL
    }                                                          OPTIONAL, --
Need OP
    radioResourceConfigCommon      RadioResourceConfigCommonSIB,
    ue-TimersAndConstants          UE-TimersAndConstants,
    freqInfo                       SEQUENCE {
        ul-CarrierFreq                 ARFCN-ValueEUTRA
OPTIONAL, -- Need OP
        ul-Bandwidth                   ENUMERATED {n6, n15, n25, n50, n75,
n100}
                                                               OPTIONAL, --
Need OP
        additionalSpectrumEmission     AdditionalSpectrumEmission
    },
    mbsfn-SubframeConfigList       MBSFN-SubframeConfigList
```

TABLE 10-continued

```
    OPTIONAL,    -- Need OR
    timeAlignmentTimerCommon        TimeAlignmentTimer,
    ...,
    lateNonCriticalExtension        OCTET STRING (CONTAINING
SystemInformationBlockType2-v8h0-IEs)        OPTIONAL,
    [[ ssac-BarringForMMTEL-Voice-r9        AC-BarringConfig
    OPTIONAL, -- Need OP
        ssac-BarringForMMTEL-Video-r9        AC-BarringConfig
    OPTIONAL, -- Need OP
    ]],
    [[ ac-BarringForCSFB-r10        AC-BarringConfig        OPTIONAL -
- Need OP
    ]],
    [[ ac-BarringSkipForMMTELVoice-r12        ENUMERATED {true}
    OPTIONAL, -- Need OP
        ac-BarringSkipForMMTELVideo-r12        ENUMERATED {true}
    OPTIONAL, -- Need OP
        ac-BarringSkipForSMS-r12        ENUMERATED {true}        OPTIONAL,
-- Need OP
        ac-BarringPerPLMN-List-r12        AC-BarringPerPLMN-List-r12
    OPTIONAL -- Need OP
    ]],
    [[ voiceServiceCauseIndication-r12        ENUMERATED {true}        OPTIONAL
    ]],
    [[ acdc-BarringForCommon-r13        ACDC-BarringForCommon-r13
    OPTIONAL, -- Need OP
        acdc-BarringPerPLMN-List-r13        ACDC-BarringPerPLMN-List-r13 OPTIONAL
    ]]
}
SystemInformationBlockType2-v8h0-IEs ::= SEQUENCE {
    multiBandInfoList        SEQUENCE (SIZE (1..maxMultiBands)) OF
AdditionalSpectrumEmission        OPTIONAL, -- Need OR
    nonCriticalExtension        SystemInformationBlockType2-v9e0-IEs
    OPTIONAL
}
SystemInformationBlockType2-v9e0-IEs ::= SEQUENCE {
    ul-CarrierFreq-v9e0        ARFCN-ValueEUTRA-v9e0        OPTIONAL, --
Cond ul-FreqMax
    nonCriticalExtension        SEQUENCE { }        OPTIONAL
}
AC-BarringConfig ::=        SEQUENCE {
    ac-BarringFactor        ENUMERATED {
                p00, p05, p10, p15, p20, p25, p30, p40,
                p50, p60, p70, p75, p80, p85, p90, p95},
    ac-BarringTime        ENUMERATED {s4, s8, s16, s32, s64, s128,
s256, s512},
    ac-BarringForSpecialAC        BIT STRING (SIZE(5))
}
MBSFN-SubframeConfigList ::=        SEQUENCE (SIZE (1..maxMBSFN-
Allocations)) OF MBSFN-SubframeConfig
AC-BarringPerPLMN-List-r12 ::=        SEQUENCE (SIZE (1.. maxPLMN-r11)) OF AC-
BarringPerPLMN-r12
AC-BarringPerPLMN-r12 ::=        SEQUENCE {
    plmn-IdentityIndex-r12        INTEGER (1..maxPLMN-r11),
    ac-BarringInfo-r12        SEQUENCE {
        ac-BarringForEmergency-r12        BOOLEAN,
        ac-BarringForMO-Signalling-r12        AC-BarringConfig        OPTIONAL, --
Need OP
        ac-BarringForMO-Data-r12        AC-BarringConfig        OPTIONAL -- Need
OP
    }                        OPTIONAL, -- Need OP
    ac-BarringSkipForMMTELVoice-r12        ENUMERATED {true}        OPTIONAL, --
Need OP
    ac-BarringSkipForMMTELVideo-r12        ENUMERATED {true}        OPTIONAL, --
Need OP
    ac-BarrtngSkipForSMS-r12        ENUMERATED {true}        OPTIONAL, -- Need
OP
    ac-BarringForCSFB-r12        AC-BarringConfig        OPTIONAL, -- Need
OP
    ssac-BarringForMMTEL-Voice-r12        AC-BarringConfig        OPTIONAL, --
Need OP
    ssac-BarringForMMTEL-Video-r12        AC-BarringConfig        OPTIONAL --
Need OP
}
ACDC-BarringForCommon-r13 ::=        SEQUENCE {
    acdc-HPLMNonly-r13        BOOLEAN,
    barringPerACDC-CategoryList-r13        BarringPerACDC-CategoryList-
r13
}
ACDC-BarringPerPLMN-List-r13 ::=        SEQUENCE (SIZE (1.. maxPLMN-r11)) OF
```

TABLE 10-continued

```
ACDC-BarringPerPLMN-r13
ACDC-BarringPerPLMN-r13 ::=      SEQUENCE {
   plmn-IdentityIndex-r13          INTEGER (1..maxPLMN-r11),
   acdc-OnlyForHPLMN-r13           BOOLEAN,
   barringPerACDC-CategoryList-r13          BarringPerACDC-CategoryList-
r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::= SEQUENCE {
   acdc-Category-r13               INTEGER (1..maxACDC-Cat-r13),
   acdc-BarringConfig-r13          SEQUENCE {
      ac-BarringFactor-r13            ENUMERATED {
                                       p00, p05, p10, p15, p20, p25, p30, p40,
                                       p50, p60, p70, p75, p80, p85, p90, p95},
      ac-BarringTime-r13              ENUMERATED {s4, s8, s16, s32, s64, s128,
s256, s512}
   }                               OPTIONAL -- Need OP
}
PWS-PreDefinedStrings-r15 ::= SEQUENCE {
   pws-NumberOfStrings-r15         INTEGER (1..maxPWS-Strings-r15),
   pws-StringConfig-r15            SEQUENCE {
      pws-String-r15                  ENUMERATED {
                                       str0, str1, str2, str3, str4, ... },
   }                               OPTIONAL -- Need OP
}
-- ASN1STOP
```

TABLE 11

SystemInformationBlockType2 field descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
acdc-BarringConfig
Barring configuration for an ACDC category. If the field is absent, access to the cell is considered as not barred for the ACDC category in accordance with subclause 5.3.3.13.
acdc-Category
Indicates the ACDC category as defined in TS 24.105 [72].
acdc-OnlyForHPLMN
Indicates whether ACDC is applicable for UEs not in their HPLMN for the corresponding PLMN. TRUE indicates that ACDC is applicable only for UEs in their HPLMN for the corresponding PLMN. FALSE indicates that ACDC is applicable for both UEs in their HPLMN and UEs not in their HPLMN for the corresponding PLMN.
additionalSpectrumEmission
The UE requirements related to IE AdditionalSpectrumEmission are defined in TS 36.101 [42, table 6.2.4.1]. NOTE 1.
barringPerACDC-CategoryList
A list of barring information per ACDC category according to the order defined in TS 22.011 [10]. The first entry in the list corresponds to the highest ACDC category of which applications are the least restricted in access attempts at a cell, the second entry in the list corresponds to the ACDC category of which applications are restricted more than applications of the highest ACDC category in access attempts at a cell, and so on. The last entry in the list corresponds to the lowest ACDC category of which applications are the most restricted in access attempts at a cell.
mbsfn-SubframeConfigList
Defines the subframes that are reserved for MBSFN in downlink. NOTE 1.
multiBandInfoList
A list of additionalSpectrumEmission i.e. one for each additional frequency band included in multiBandInfoList in SystemInformationBlockType1, listed in the same order.
plnm-IdentityIndex
Index of the PLMN in plmn-IdentityList included in SIB1. Value 1 indicates the PLMN listed 1st in plmn-IdentityList included in SIB1. Value 2 indicates the PLMN listed 2nd in plmn-IdentityList included in SIB1 and so on. NOTE 1.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, NRB, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. NOTE 1.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency. NOTE 1.
voiceServiceCauseIndication
Indicates whether UE is requested to use the establishment cause mo-VoiceCall for mobile originating MMTEL voice calls.
PWS-PreDefinedStrings
Indicates the set of PreDefined Strings (PDSs).
pws-NumberOfStrings
Indicates the number of PreDefined Strings (PDSs).
pws-String
Indicates defined PreDefined String (PDS) #1, #2, . . . , #maxPWS-Strings.

Also, the UE receives from the eNB third control information including instructions (or indications) of UE operations predefined for the respective PDSs S1003.

The third control information may have a mapping relationship between PDSs and instructions (or indications) of UE operations in the form of a table.

In this case, the third control information may be represented by 'PDSconfigurationtable' and transmitted through SIB2 or SIB12.

In other words, the third control information represents instructions about required or predefined UE operations (a sound, vibration, or display of a specific icon or an image) if the use of a PDS set is enabled in the eNB and the corresponding UE receives one or more PDSs from the eNB.

In other words, in case the UE receives a warning message including at least one PDS from the eNB, the UE performs a required or predefined operation according to the received third control information.

For example, in case the PDSs included in the warning message are string 0, string 1, and string 3; and represent 'Earthquake', 'Tsunami', and 'Go out of building', respectively, the UE may perform operations (for example, display of icon(s) or image(s), voice output, or vibration output) corresponding to the meaning of each string according to the third control information.

In addition, the UE may receive from the eNB fourth control information related to the type or configuration of the warning message including at least one PDS.

The corresponding procedure may be performed preferably after the S1003 step. However, the present invention may not be limited to the aforementioned preferred embodiment, and the corresponding procedure may be performed after a specific step of FIG. 10.

In other words, the PDS(s) that has to be included in a warning message may be determined beforehand according to an emergency situation, and the warning message type may be determined according to the included PDS(s).

In this case, receiving a warning message of a specific type, the UE may know the PDSs included in the warning message in advance, and thus the UE only has to perform the corresponding required UE operation.

The fourth control information may be transmitted through SIB12, and Tables 12 to 14 below illustrate one example of SIB12 format including the fourth control information.

TABLE 12

```
-- ASN1START
SystemInformationBlockType12-r9 ::= SEQUENCE {
    messageIdentifier-r9            BIT STRING (SIZE (16)),
    serialNumber-r9                 BIT STRING (SIZE (16)),
    warningMessageSegmentType-r9    ENUMERATED {notLastSegment,
lastSegment},
    warningMessageSegmentNumber-r9  INTEGER (0..63),
    pws-MessageConfigurationWithPreDefinedString-r15    SEQUENCE {
        pws-MessagewithPreDefinedString-r15     ENUMERATED {
                                    str0, str1, str2, str3, str4, ... },
    }                               OPTIONAL -- Need OP
    warningMessageSegment-r9        OCTET STRING,
    dataCodingScheme-r9             OCTET STRING (SIZE (1))   OP-
                                    TIONAL,
    lateNonCriticalExtension        OCTET STRING        OPTIONAL,
    ...
}
-- ASN1STOP
```

TABLE 13

SystemInformationBlockType12 field descriptions dataCodingScheme
Identifies the alphabet/coding and the language applied variations of a CMAS notification. The octet (which is equivalent to the octet of the equivalent IE defined in TS 36.413 contains the octet of the equivalent IE defined in TS 23.041 and encoded according to TS 23.038.
messageIdentifier
Identifies the source and type of CMAS notification. The leading bit (which is equivalent to the leading bit of the equivalent IE defined in TS 36.413) contains bit 7 of the first octet of the equivalent IE, defined in and encoded according to TS 23.041, while the trailing bit contains bit 0 of second octet of the same equivalent IE.
serialNumber
Identifies variations of a CMAS notification. The leading bit (which is equivalent to the leading bit of the equivalent IE defined in TS 36.413) contains bit 7 of the first octet of the equivalent IE, defined in and encoded according to TS 23.041, while the trailing bit contains bit 0 of second octet of the same equivalent IE.
pws-MessageConfigurationWithPreDefinedString
Warning message representation with Pre-defined String(s).
pws-MessagewithPreDefinedString
Warning message represented with the use of a set of Pre-defined String(s): e.g., str0, str1, str3 in which str0, str1 and str3 mean "Earthquake", "Tsunami", "Go out of building", respectively; this ordered set of Pre-defined Strings (str0, str1, str3) can display icons visually or audio-visually (e.g., via icons, via sound, via tactile indication (e.g., types of vibration)) advising the user of such meaning.
warningMessageSegment
Carries a segment of the Warning Message Contents IE defined in TS 36.413. The first octet of the Warning Message Contents IE is equivalent to the first octet of the CB data IE defined in and encoded according to TS 23.041 and so on.
warningMessageSegmentNumber
Segment number of the CMAS warning message segment contained in the SIB. A segment number of zero corresponds to the first segment, one corresponds to the second segment, and so on.
warningMessageSegmentType
Indicates whether the included CMAS warning message segment is the last segment or not.

TABLE 14

| Conditional presence | Explanation |
| --- | --- |
| Segment1 | The field is mandatory present in the first segment of SIB12, otherwise it is not present. |

Next, the UE receives a warning message from the eNB S1004 and displays the received warning message S1005.

As described above, in case the use of a PDS (set) is enabled in the eNB and at least one PDS is included in the warning message, the UE performs a required or predefined UE operation corresponding to the at least one PDS.

Here, the UE may display the at least one PDS together when the warning message is displayed, or the UE may display only the at least one PDS.

In other words, whether the warning message is displayed simultaneously with the at least one PDS may be an option for the user.

If the warning message does not include at least one PDS, the UE displays the warning message in the form of text in a conventional manner.

PDS Configuration Change

Next, described will be a method for processing the aforementioned third control information in case the third control information is changed while a warning message is transmitted and received between a UE and an eNB.

FIG. 11 illustrates one example of a method for changing PDS configuration according to the present invention.

First, a CBE (Cell Broadcast Entity) transmits change indication information indicating change of third control information to the MME S1101.

The third control information may be represented by PDSConfigurationTable.

Afterwards, the MME, under its control, transmits the received change indication information to the eNB(s) S1102.

Next, the eNB transmits change indication information received from the MME to the UE(s) S1103.

Here, the change indication information may be represented by a 1 bit indicator indicating only the change of the third control information. The 'systeminforvalueTag' field of SIB1 or other particular field providing a function similar to that of the 'systeminforvalueTag' field may be used for representing the change indication information.

Afterwards, the changed (or new or updated) third control information goes through the CBE, MME, and eNB in a sequential order to be transmitted to the UEs S1104.

The UE receiving the change indication information indicating change of the third control information again reads the third control information (namely new (or changed or updated) third control information) transmitted through the SIB2 and applies the third control information for reception of a warning message S1105.

Therefore, the UE receives a warning message from the eNB on the basis of the changed third control information and performs a required or predefined operation corresponding to the PDS included in the received warning message.

The change indication information indicating change of the third control information may be transceived through a system information block or a paging message.

Tables 15 and 16 below illustrate one example of a SystemInformationBlockTypeX format including change indication information, and Tables 17 and 18 below illustrate one example of a paging message (or paging notification) format including change indication information.

TABLE 15

```
-- ASN1START
SystemInformationBlockTypeX ::=    SEQUENCE {
...
    PDSConfigurationTableValueTag           INTEGER (0..31),
...
}
}
-- ASN1STOP
```

TABLE 16

SystemInformationBlockTypeX field descriptions

PDSConfigurationTableValueTag
To indicate that PDSConfigurationTable is changed. If a different value is received by a UE, the UE shall re-read the PDSConfigurationTable sent by eNB.
PDSConfigurationTable is send via SIB XX.
Instead of using PDSConfigurationTableValueTag, the serving network can use SystemInfoValueTag to indicate the change of PDSConfigurationTable (which is delivered via SIB XX).

TABLE 17

```
-- ASN1START
Paging ::=                SEQUENCE {
    pagingRecordList      PagingRecordList      OPTIONAL, -
```

TABLE 17-continued

```
- Need ON
    systemInfoModification      ENUMERATED {true}    OPTIONAL, -
- Need ON
    PDSConfigurationTableModification    ENUMERATED {true}
    OPTIONAL, -- Need ON
    etws-Indication             ENUMERATED {true}    OPTIONAL, -
- Need ON
    nonCriticalExtension        Paging-v890-IEs      OPTIONAL
}
Paging-v890-IEs ::=         SEQUENCE {
    lateNonCriticalExtension    OCTET STRING         OPTIONAL,
    nonCriticalExtension        Paging-v920-IEs
    OPTIONAL
}
Paging-v920-IEs ::=         SEQUENCE {
    cmas-Indication-r9          ENUMERATED {true}    OPTIONAL, -
- Need ON
    nonCriticalExtension        Paging-v1130-IEs     OPTIONAL
}
Paging-v1130-IEs ::=        SEQUENCE {
    eab-ParamModification-r11   ENUMERATED {true}    OPTIONAL, -
- Need ON
    nonCriticalExtension        Paging-v1310-IEs     OPTIONAL
}
Paging-v1310-IEs ::=        SEQUENCE {
    redistributionIndication-r13 ENUMERATED {true}   OPTIONAL, -
-Need ON
    systemInfoModification-eDRX-r13 ENUMERATED {true}
    OPTIONAL, -- Need ON
    nonCriticalExtension        SEQUENCE { }         OPTIONAL
}
PagingRecordList ::=        SEQUENCE (SIZE (1..maxPageRec)) OF
    PagingRecord
PagingRecord ::=            SEQUENCE {
    ue-Identity                 PagingUE-Identity,
    cn-Domain                   ENUMERATED    {ps, cs},
    ...
}
PagingUE-Identity ::=       CHOICE {
    s-TMSI                      S-TMSI,
    imsi                        IMSI,
    ...
}
IMSI ::=                    SEQUENCE (SIZE (6..21)) OF IMSI-Digit
IMSI-Digit ::=              INTEGER (0..9)
-- ASN1STOP
```

TABLE 18

Paging field descriptions cmas-Indication
If present: indication of a CMAS notification.
cn-Domain
Indicates the origin of paging.
eab-ParamModification
If present: indication of an EAB parameters (SIB14) modification.
etws-Indication
If present: indication of an ETWS primary notification and/or ETWS secondary notification.
imsi
The International Mobile Subscriber Identity, a globally unique permanent subscriber identity, see TS 23.003. The first element contains the first IMSI digit, the second element contains the second IMSI digit and so on.
redistributionIndication
If present: indication to trigger E-UTRAN inter-frequency redistribution procedure as specified in TS 36.304.
systemInfoModification
If present: indication of a BCCH modification other than SIB10, SIB11, SIB12 and SIB14. This indication does not apply to UEs using eDRX cycle longer than the BCCH modification period.
PDSConfigurationTableModification
If present: indication of a BCCH modification on SIB XX (for PDSConfigurationTable).

TABLE 18-continued

Paging field descriptions

Instead of using PDSConfigurationTableModification, the serving network can use systemInfoModification to indicate the change of PDSConfigurationTable (which is delivered via SIB XX).
systemInfoModification-eDRX
If present: indication of a BCCH modification other than SIB10, SIB11, SIB12 and SIB14. This indication applies only to UEs using eDRX cycle longer than the BCCH modification period.
ue-Identity
Provides the NAS identity of the UE that is being paged.

FIG. 12 is a flow diagram illustrating one example of a method for transceiving a warning message by using a PDS according to the present invention.

The S1201 to S1207 steps of FIG. 12 are the same as the step 0. to step 6. of FIG. 5, and the S1209 and S1210 of FIG. 12 are the same as step 8. and step 9. of FIG. 5. Therefore, in what follows, only those parts different from previous descriptions will be dealt with primarily.

After the S1207 step, the UE checks whether a warning message (for example, PWS message) received from the eNB includes a PDS.

In case it is found from the checking result that the PDS belongs to the warning message, the UE performs a required (or predefined) UE operation corresponding to the PDS on the screen of the UE when the warning message is displayed S1208.

In other words, the UE outputs an indicator for notifying the user of an emergency situation or a warning situation by using an image, icon, or voice S1208.

Here, the indicator may be output at the same time as a warning message is received, or the indicator may be output through a user input.

As one example, in case the indicator is an icon and the UE receives a user input touching the icon, the indicator, namely the icon may be output.

For example, in case an icon is used for the indicator, the UE may display PDSs for the user, which read 'an earthquake has occurred', 'do not worry since tsunami is not coming', and so on.

Afterwards, S1209 and S1210 steps are performed.

FIG. 13 is a flowchart illustrating an operation method of a terminal receiving a warning message using PDS proposed in the present specification.

First, the terminal receives, from a base station, first control information indicating whether or not the use of a pre-defined string (PDS) set is enabled (S1301).

The PDS set includes one or more PDSs used to immediately recognize occurrence of an emergency.

The one or more pre-defined string (PDS)s are associated with an alarm information that the warning message is outputted visually, audibly or tactilely.

Here, the first control information is received through an attach procedure with the base station.

The attach procedure includes a roaming procedure.

Also, the first control information can be received through a system information block (SIB) 1.

Then, the terminal receives, from the base station, second control information associated with a configuration of the PDS set (S1302).

Here, the second control information includes at least one of first indication information indicating the PDS set, second indication information indicating a number of the PDSs included in the PDS set, or third indication information indicating a length of each PDS within the PDS set.

The third indication information is included in the second control information if the length of each PDS within the PDS set is different.

Also, the second control information can be received through a system information block (SIB) 2.

Then, the terminal receives, from the base station, the warning message (S1303).

Then, the terminal determines whether to output the warning message as a text or as the alarm information corresponding to the one or more PDSs based on the received indication information.

This step can be performed after the S1303 step.

Then, the terminal outputs the warning message according to the determination result (S1304).

Here, if the use of the PDS set is enabled, the warning message is outputted to the alarm information corresponding to the one or more PDSs, and if the use of the PDS set is not enabled, the warning message is outputted to the text.

The alarm information is information informing a user that an emergency has occurred or that the emergency has been ended.

The alarm information is information defined by a specific PDS set if the received warning message includes the specific PDS set configured by one or more PDSs.

The alarm information is an image, an icon, sound or vibration.

Also, the terminal can receive, from the base station, third control information related to a configuration of the specific PDS set included in the warning message.

Also, the third control information can be received through a system information block (SIB) 12.

Also, the terminal receives, from the base station, fourth control information indicating whether or not the second control information is changed.

The fourth control information is included in a system information block or a paging message.

FIG. 14 is a flowchart illustrating an operation method of a base station transmitting a warning message using PDS proposed in the present specification.

The base station transmits, to a terminal, first control information indicating whether or not the use of a pre-defined string (PDS) set including one or more PDSs used for a Public Warning System (PWS) is enabled (S1401).

Here, the first control information is received through an attach procedure with the terminal.

The attach procedure can include a roaming procedure.

Also, the first control information can be received through a system information block (SIB) 1.

Then, the base station transmits, to the terminal, second control information associated with a configuration of the PDS set (S1402).

Here, the second control information includes at least one of first indication information indicating the PDS set, second indication information indicating a number of the PDSs included in the PDS set, or third indication information indicating a length of each PDS within the PDS set.

The third indication information is included in the second control information if the length of each PDS within the PDS set is different.

Also, the second control information can be received through a system information block (SIB) 2.

Then, the terminal transmits a first warning message including at least one PDS to the terminal (S1403).

Before the step S1401, the base station can receive one or more second warning messages from at least one MME (mobility management entity).

Here, the one or more second warning messages include at least one of a message identifier or a message sequence number.

Then, the base station can check whether the received second warning messages are the same message by using at least one of the message identifier or the message serial number.

If the received second warning messages are same, only the first warning message of the received second warning messages is transmitted to the terminal.

If the received second warning messages are not same, all the received second warning messages are transmitted to the terminal.

Also, the base station can determine at least one cell for transmitting the received second warning messages to the terminal based on the alert area information included in the received second warning messages.

The second warning messages (or at least one second warning message) comprise third control information indicating whether or not concurrent transmission of a warning message is supported.

So, the base station can determine whether to transmit the first warning message and the second warning messages simultaneously based on the received third control information.

Here, the third control information is included in the second warning messages if the first warning message is transmitted to the terminal.

If the third control information indicates the support of concurrent transmission, the first warning message and the second warning message are transmitted to the terminal simultaneously.

Or, if the third control information does not indicate the support of concurrent transmission, the transmission of the first warning message is stopped, and the second warning message is transmitted to the terminal.

The third control information is not included in the second warning message, the second warning message has a higher priority than the first warning message.

The first warning message is transmitted to the terminal on a predetermined time interval.

General Apparatus to which an Embodiment of the Present Invention May be Applied FIG. 15 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 15, the network entity 1510 and the UE (or the vehicle UE) 1520 include communication units (transmitting/receiving units, RF units, 1513 and 1523), processors 1511 and 1521, and memories 1512 and 1522.

The network entity and the UE may further input units and output units.

The communication units 1513 and 1523, the processors 1511 and 1521, the input units, the output units, and the memories 1512 and 1522 are operatively connected with each other in order to conduct the methods as proposed herein.

The communication units (transmitting/receiving units or RF units, 1513 and 1523), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1511 and 1521 implement functions, procedures, and/or methods as proposed herein. The layers of radio interface protocols may be implemented by the processors.

The processors may be represented as control parts, controllers, control units, or computers.

The memories 1512 and 1522 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

INDUSTRIAL APPLICABILITY

Examples in which the method for transceiving a warning message in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for receiving a warning message in a wireless communication system, the method performed by a terminal comprising:

receiving, from a base station, first control information indicating whether or not a use of a pre-defined string (PDS) set is enabled, wherein the PDS set includes one or more PDSs used to immediately recognize occurrence of an emergency, wherein the one or more pre-defined string (PDS)s are associated with an alarm information that the warning message is outputted visually, audibly or tactilely;

receiving, from the base station, second control information associated with a configuration of the PDS set, wherein the second control information includes at least one of first indication information indicating the PDS set, second indication information indicating a number of the PDSs included in the PDS set, or third indication information indicating a length of each PDS within the PDS set;

receiving, from the base station, the warning message;

determining whether to output the warning message as a text or as the alarm information corresponding to the one or more PDSs based on the received indication information; and outputting the warning message according to the determination result.

2. The method of claim 1, wherein the alarm information is information defined by a specific PDS if the received warning message includes the specific PDS configured by at least one PDS.

3. The method of claim 1, wherein if the use of the PDS set is enabled, the warning message is outputted to the alarm information corresponding to the one or more PDSs, and if the use of the PDS set is not enabled, the warning message is outputted to the text.

4. The method of claim 1, wherein the third indication information is included in the second control information if the length of each PDS within the PDS set is different.

5. The method of claim 1, wherein the alarm information is one or more of image, icon, sound and vibration.

6. The method of claim 1, further comprising:

receiving, from the base station, a third control information indicating a configuration of the specific PDS included in the warning message.

7. The method of claim 1, wherein the first control information is received through an attach procedure with the base station.

8. The method of claim 6, wherein the first control information is received through a system information block (SIB) 1, wherein the second control information is received through a system information block (SIB) type 2, and wherein the third control information is received through a system information block (SIB) type 12.

9. The method of claim 1, further comprising:

receiving a fourth control information indicating whether or not the second control information is changed from the base station.

10. The method of claim 9, wherein the fourth control information is included in a system information block or a paging message.

11. A method for transmitting a warning message in a wireless communication system, the method performed by a base station comprising:

transmitting, to a terminal, first control information indicating whether or not a use of a pre-defined string (PDS) set is enabled, wherein the PDS set includes one or more PDSs used to immediately recognize occurrence of an emergency, wherein the one or more pre-defined string (PDS)s are associated with an alarm information that the warning message is outputted visually, audibly or tactilely;

transmitting, to the terminal, second control information associated with a configuration of the PDS set, wherein the second control information includes at least one of first indication information indicating the PDS set, second indication information indicating a number of the PDSs included in the PDS set, or third indication information indicating a length of each PDS within the PDS set;

transmitting a first warning message to the terminal.

12. The method of claim 11, further comprising:

receiving at least one second warning message from at least one MME (mobility management entity), wherein the at least one second warning message includes at least one of a message identifier or a message sequence number; and checking whether the at least one received second warning message is the same message by using at least one of the message identifier or the message serial number.

13. The method of claim 12, wherein if the at least received one second warning message is the same, only the first warning message is transmitted to the terminal.

14. The method of claim 12, further comprising:

determining at least one cell for transmitting the at least one received second warning message to the terminal based on the alert area information included in the at least received one second warning message.

15. The method of claim 12, wherein the at least one second warning message comprises third control information indicating whether or not concurrent transmission of a warning message is supported.

16. The method of claim 15, further comprising:

determining whether to transmit the first warning message and the second warning message simultaneously based on the received third control information.

17. The method according to claim 15, wherein the third control information is included in the second warning message if the first warning message is transmitted to the terminal.

18. The method of claim 15, wherein if the third control information indicates the support of concurrent transmission, the first warning message and the second warning message are transmitted to the terminal simultaneously, if the third control information does not indicate the support of concurrent transmission, the transmission of the first warning message is stopped, and the second warning message are transmitted to the terminal.

19. The method of claim 12, wherein the third control information is not included in the second warning message, the second warning message has a higher priority than the first warning message.

20. A terminal for receiving a warning message in a wireless communication system, comprising:

a radio frequency (RF) module for transceiving a radio signal; and a processor functionally connected to the RF module, wherein the processor is configured:

to receive, from a base station, first control information indicating whether or not a use of a pre-defined string (PDS) set is enabled, wherein the PDS set includes one or more PDSs used to immediately recognize occurrence of an emergency, wherein the one or more pre-defined string (PDS)s are associated with an alarm information that the warning message is outputted visually, audibly or tactilely;

to receive, from the base station, second control information associated with a configuration of the PDS set, wherein the second control information includes at least one of first indication information indicating the PDS set, second indication information indicating a number of the PDSs included in the PDS set, or third indication information indicating a length of each PDS within the PDS set;

to receive, from the base station, the warning message;

to determine whether to output the warning message as a text or as the alarm information corresponding to the one or more PDSs based on the received indication information; and to output the warning message according to the determination result.

* * * * *